United States Patent [19]

Takahashi et al.

[11] Patent Number: 4,537,847
[45] Date of Patent: Aug. 27, 1985

[54] DISAZO PHOTORECEPTORS FOR ELECTROPHOTOGRAPHY

[75] Inventors: Jiro Takahashi; Kiyoshi Sawada, both of Hachioji; Akira Kinoshita, Hino; Tawara Komamura; Satoshi Goto, both of Hachioji; Osamu Sasaki, Hino, all of Japan

[73] Assignee: Konishiroku Photo Industry Co., Ltd., Tokyo, Japan

[21] Appl. No.: 640,205

[22] Filed: Aug. 10, 1984

Related U.S. Application Data

[63] Continuation of Ser. No. 435,102, Oct. 18, 1982, abandoned.

[30] Foreign Application Priority Data

Oct. 23, 1981 [JP] Japan .................... 56-169554
Feb. 15, 1982 [JP] Japan .................... 57-23297

[51] Int. Cl.³ ............................................ G03G 5/06
[52] U.S. Cl. .......................... 430/58; 430/70; 430/72; 430/73; 430/74; 430/75; 430/76; 430/78
[58] Field of Search ............ 430/58, 59, 70, 71, 430/72, 73, 74, 75, 76, 77, 78, 79

[56] References Cited

U.S. PATENT DOCUMENTS 4,272,598  6/1981  Sasaki et al. .................. 430/58 X
4,359,513 11/1982  Katagiri et al. ................ 430/58

Primary Examiner—Roland E. Martin
Attorney, Agent, or Firm—Jordan B. Bierman

[57] ABSTRACT

Photoreceptor for electrophotography comprising a conductive support and an overlaying photosensitive layer thereon, said photosensitive layer containing at least one azo compound of Formula I or II

FORMULA I

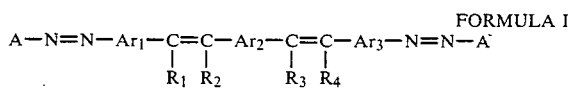

-continued

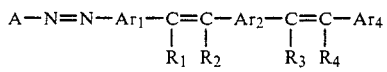

Formula II wherein $Ar_1$, $Ar_2$, $Ar_3$ and $Ar_4$ each is an aromatic hydrocarbon ring radical or an aromatic heterocyclic ring radical; $R_1$, $R_2$, $R_3$ and $R_4$ each is an electron attractive group or hydrogen provided that at least one of $R_1$, $R_2$, $R_3$ and $R_4$ is an electron attractive group; and A is

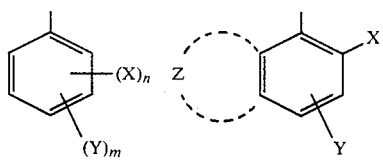

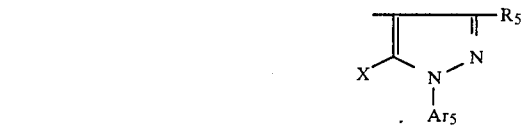

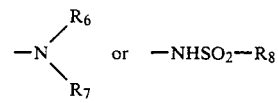

wherein X is a hydroxy group or a group represented by the formula:

$$-N\begin{array}{c}R_6\\R_7\end{array} \quad \text{or} \quad -NHSO_2-R_8$$

wherein $R_6$ and $R_7$ each is hydrogen or an alkyl group, and $R_8$ is an alkyl or aryl group; Y is halogen, an alkyl or alkoxy group, a carboxy group, a sulfo group, a carbamoyl or sulfamoyl group; Z is an atomic group necessary for making an aromatic hydrocarbon ring or an aromatic heterocyclic ring; $R_5$ is hydrogen, an amino or carbamoyl group, a carboxy group or an ester group thereof; $Ar_5$ is an aryl group; n is an integer of 1, 2 or 3; and m is an integer of 0, 1 or 2.

15 Claims, 6 Drawing Figures

DISAZO PHOTORECEPTORS FOR ELECTROPHOTOGRAPHY

This is a continuation of Ser. No. 435,102, filed Oct. 18, 1982, abandoned.

This application claims priority of Japanese Application No. 169554/81, filed Oct. 23, 1981, and No. 23297/82, filed Feb. 15, 1982.

FIELD OF THE INVENTION

The present invention relates to a photoreceptor for electrophotography, and more particularly to a new photoreceptor having a photosensitive layer containing an azo compound, said photoreceptor being highly sensitive and durable to withstand repeated use.

BACKGROUND OF THE INVENTION

Most of the conventional photoreceptors for electrophotography use photosensitive layers that comprise inorganic photoconductive materials such as selenium, zinc oxide and cadmium sulfide. But these photoreceptors do not have a good balance of sensitivity, heat stability, moisture resistance and durability, and in particular, those using selenium and cadmium sulfide have been difficult to manufacture and handle because of the toxicity of these photoconductive materials. Photoreceptors using photosensitive layers that comprise organic photoconductive compounds are gaining acceptance nowadays since they are easy to manufacture and handle, are low in cost and have higher heat stability than those using selenium as a photoconductive material. The best known organic photoconductive compound is poly-N-vinylcarbazole, and a photoreceptor using a photosensitive layer comprising a charge transfer complex made from said compound and a Lewis acid such as 2,4,7-trinitro-9-fluorenone is used commercially, but it is not altogether satisfactory in respect of sensitivity and durability.

Double-layer or dispersion function separated photoreceptors wherein the functions of carrier generation and transport are fulfilled by two separate materials are known, and they have great latitude in selecting components suitable for making products having desired photographic characteristics such as charge characteristics, sensitivity and durability. Various combinations of carrier generation materials and carrier transport materials have been proposed, and a photoreceptor using a photosensitive layer that consists of a carrier generation layer comprising amorphous selenium and a carrier transport layer comprising poly-N-vinylcarbazole is in commercial use. However, the carrier generation layer comprising amorphous selenium does not have high heat stability.

Using organic dyes and pigments as carrier generation materials has been proposed, and photoreceptors containing monoazo compounds or bisazo compounds in photosensitive layers have been disclosed in Japanese Patent Publication No. 30513/73, Japanese Patent Applications (OPI) Nos. 4214/77, 133445/78 and 46558/79 (the symbol OPI as used herein means an unexamined published Japanese patent application) and Japanese Patent Publication No. 11945/81. But the azo compounds used in these patents are not always satisfactory in respect of sensitivity, residual potential or stability to repeated use. What is more, they are compatible with only a limited class of carrier transport materials, and no photoreceptor that completely meets the requirements for electrophotographic process has been found. The bisazo compound disclosed in Japanese Patent Application (OPI) No. 116040/81 is not highly stable and it does not have high sensitivity in the long wavelength range.

SUMMARY OF THE INVENTION

One object of the present invention is to provide an improved photoreceptor for electrophotography that has high sensitivity and low residual potential and which is durable in that these characteristics remain essentially constant after repeated use.

Another object of the present invention is to provide a photoreceptor that contains an azo compound which is stable against heat and light and has great charge generating ability.

Still another object of the present invention is to provide a photoreceptor that contains an azo compound which can be used as an effective carrier generation material in combination with a wide variety of carrier transport materials.

These and other objects which will become apparent by reading the following description in association with the accompanying drawings can be accomplished by a photoreceptor for electrophotography using an azo compound of the following formula (I) or (II):

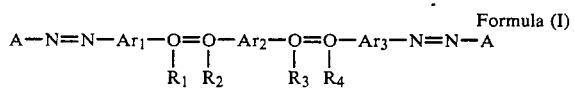

Formula (I)

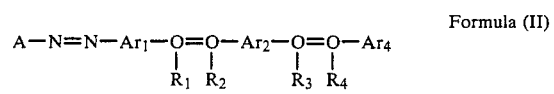

Formula (II)

wherein $Ar_1$, $Ar_2$, $Ar_3$ and $Ar_4$ each is an aromatic hydro carbon ring radical or an aromatic heterocyclic ring radical; $R_1$, $R_2$, $R_3$ and $R_4$ each is an electron attractive group or hydrogen provided that at least one of $R_1$, $R_2$, $R_3$ and $R_4$ is an electron attractive group; and A is

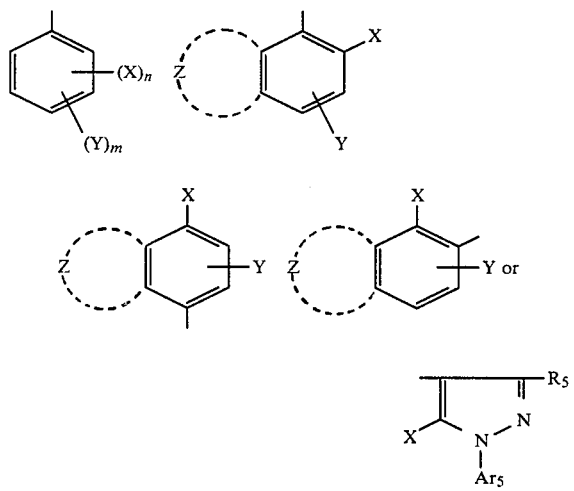

(wherein X is a hydroxy group or a group represented by the formula:

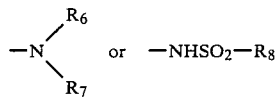

wherein $R_6$ and $R_7$ each is hydrogen, or an alkyl group, and $R_8$ is an alkyl or aryl group; Y is halogen, an alkyl or alkoxy group, a carboxy group, a sulfo group, a carbamoyl or sulfamoyl group; Z is an atomic group necessary for making an aromatic hydrocarbon ring or an aromatic heterocyclic ring; $R_5$ is hydrogen, an amino or carbamoyl group, a carboxy group or an ester group thereof; $Ar_5$ is an aryl group; n is an integer of 1, 2 or 3; and m is an integer of 0, 1 or 2).

In the azo compound of formula (I) or (II), at least one of $R_1$, $R_2$, $R_3$ and $R_4$ is an electron attractive group. Preferred electron attractive groups are a cyano group, a nitro group, and halogen such as chlorine or bromine, and a cyano group is particularly preferred.

All the groups and rings described above or herein below include those having or not having substituents and/or atoms. Said substituents and atoms include any and all groups and atoms, but preferred substituents and atoms are an alkyl such as methyl and ethyl, a halogen such as fluorine, chlorine and bromine, an alkoxy such as methoxy and ethoxy, an acyl such as acethyl and benzoyl, an alkylthio such as methylthio and ethylthio, an arylthio such as phenylthio, an aryl such as phenyl, an aralkyl such as benzyl, nitro, cyano, a dialkylamino such as dimethylamino and diethylamino, and an alkylamino such as methylamino and ethylamino.

The above mentioned substituents may have further substituents and/or atoms.

In the present invention, the rings described above include any and all rings, but preferably are 5 to 7 membered rings.

Further, the above said heterocyclic ring may be a ring composed of only hetero atoms or a ring composed of carbon and hetero atoms, but in the present invention, the latter is preferable, and particularly 5 to 7 membered rings composed of carbon and nitrogen, sulfur and/or oxygen are preferred.

One preferred embodiment is an azo compound represented by the following formula (III):

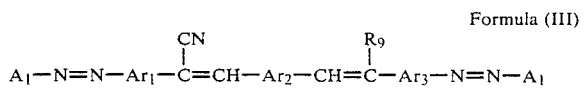

Formula (III)

{wherein $R_9$ is hydrogen atom or an cyano group, $A_1$ is

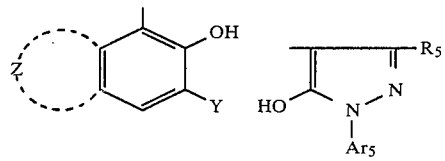

and $Ar_1$, $Ar_2$, $Ar_3$, $Ar_5$, Z, Y, and $R_5$ are as defined in formula (1).}

Further, particularly preferred is the case where the azo compound of the present invention is an azo compound represented by the following formula (IV):

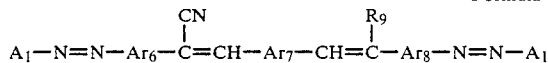

Formula (IV)

(wherein $A_1$ and $R_9$ are as defined in formula (III), and $Ar_6$, $Ar_7$ and $Ar_8$ each is a divalent phenyl group, preferably a phenyl having a substituent and/or an atom selected from an alkyl such as methyl and ethyl, an alkoxy such as methoxy and ethoxy, a halogen such as chlorine and bromine, hydroxy, and a cyano.)

More preferable is the case where the azo compound of the present invention is an azo compound represented by the following formula (V):

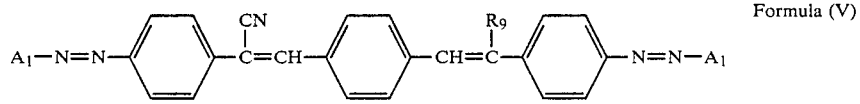

Formula (V)

{wherein $A_1$ and $R_9$ are as defined in formula (III).}

DESCRIPTION OF THE PREFERRED EMBODIMENTS

The azo compound of the present invention has high photoconductivity and a photoreceptor can be produced by forming on an electrically conductive support a photosensitive layer having this azo compound dispersed in a binder. Alternatively, this azo compound can be used as a carrier generation material which is combined with a suitable carrier transport mateiral to form a double-layer type or dispersion type function-separated photoreceptor. Azo compounds of formula (I) or (II) may be used either alone or in admixture.

Figure 1:
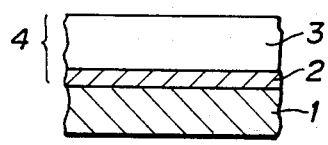
FIG. 1 is a sectional view of one embodiment of the photoreceptor of the present invention wherein an electrically conductive support has formed thereon a photosensitive layer comprising a carrier generation layer and an overlaying carrier transport layer.
Figure 2:
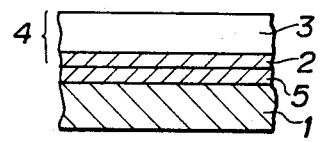
FIG. 2 is a sectional view of another embodiment of the photoreceptor of the present invention which is the same as the product of FIG. 1 except that an intermediate layer is present between the conductive support and the photosensitive layer.
Figure 3:
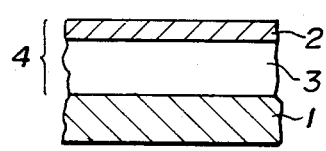
FIG. 3 is a sectional view of a third embodiment of the photoreceptor of the present invention wherein an electrically conductive support has formed thereon a photosensitive layer comprising a carrier transport layer and an overlaying carrier generation layer.
Figure 4:
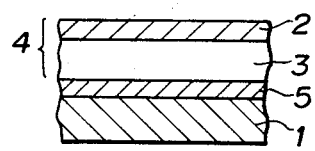
FIG. 4 is a sectional view of a fourth embodiment of the photoreceptor of the present invention which is the same as the product of FIG. 3 except that an intermediate layer is present between the conductive support and the photosensitive layer.
Figure 5:
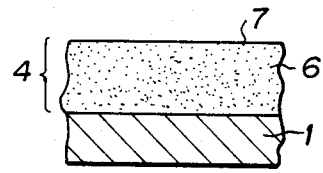
FIG. 5 is a sectional view of a fifth embodiment of the photoreceptor of the present invention wherein an electrically conductive support bears a photosensitive layer having particles of a carrier generation material dispersed in a matrix of carrier transport material.
Figure 6:
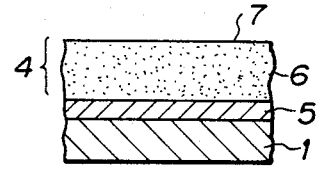
FIG. 6 is a sectional view of a sixth embodiment of the photoreceptor of the present invention which is the same as the product of FIG. 5 except that an intermediate layer is present between the conductive support and the photosensitive layer.

Various arrangements of layers are known for use in photoreceptors and all of them can be used in preparing the photoreceptor of the present invention. Common arrangements are illustrated in FIGS. 1 to 6. In FIGS. 1 and 2, an electrically conductive support 1 has formed thereon a double-layer type photosensitive layer 4 consisting of a carrier generation layer 2 comprising the azo compound and a carrier transport layer 3 comprising a carrier transport material. As shown in FIGS. 2 and 4, an intermediate layer 5 may be formed between the photosensitive layer 4 and the support 1. The best result is obtained with the double-layer photosensitive layer 4 illustrated in these Figures. According to the present invention, a photosensitive layer 4 is made of a matrix layer 6 of a carrier transport material having particles of the carrier generation material 7 dispersed therein may be formed on an electrically conductive support either directly as shown in FIG. 6 or through an intermediate layer 5 as shown in FIG. 6.

Examples of the carrier transport material that can be used in combination with the azo compound used as a carrier generation material include: electron acceptors that facilitate electron transport such as trinitrofluorenone and tetranitrofluorenone, as well as electron donors that facilitate hole transport such as polymers typified by poly-N-vinylcarbazole that have a heterocyclic compound in a side chain, triazole derivatives, oxodiazole derivatives, imidazole derivatives, pyrazoline derivatives, polyaryl alkane derivatives, phenylenediamine derivatives, hydrazone derivatives, amino-substituted chalcone derivatives, triarylamine derivatives, carbazole derivatives and stilbene derivatives. Other carrier transport materials may also be used.

The carrier generation layer 2 included in the double-layer type photosensitive layer 4 may be formed on the conductive support 1 or carrier transport layer 3 either directly or through an intermediate layer such as a bonding layer or barrier layer by one of the following two methods: (1) a solution having the azo compound dissolved in a suitable solvent is applied optionally together with a binder; and (2) the azo compound is reduced to very fine particles in a dispersion medium with a ball mill, homomixer or the like, and the resulting dispersion is applied optionally together with a binder.

Examples of the solvent or dispersion medium used in forming the carrier generation layer include n-butylamine, diethylamine, ethylenediamine, isopropanolamine, triethanolamine, triethylenediamine, N,N-dimethylformamide, acetone, methyl ethyl ketone, cyclohexanone, benzene, toluene, xylene, chloroform, 1,2-dichloroethane, dichloromethane, tetrahydrofuran, dioxane, methanol, ethanol, isopropanol, ethyl acetate, butyl acetate, and dimethyl sulfoxide.

Any binder can be incorporated in the carrier generation or transport layer, and a film-forming high-molecular polymer which is hydrophobic, has high dielectric constant and is electrically insulating is preferred. Examples (non-limiting) of such polymer are listed below:

B-(1): polycarbonates
B-(2): polyesters
B-(3): methacrylic resins
B-(4): acrylic resins
B-(5): polyvinyl chloride
B-(6): polyvinylidene chloride
B-(7): polystyrene
B-(8): polyvinyl acetate
B-(9): styrene-butadiene copolymers
B-(10): vinylidene chloride-acrylonitrile copolymers
B-(11): vinyl chloride-vinyl acetate copolymers
B-(12): vinyl chloride-vinyl acetate-maleic anhydride copolymers
B-(13): silicone resins
B-(14): silicone-alkyd resins
B-(15): phenol-formaldehyde resins
B-(16): styrene-alkyd resins
B-(17): poly-N-vinylcarbazole.

These binders may be used alone or in admixture.

The so formed carrier generation layer 2 preferably has a thickness of from 0.01 to 20 μm, more preferably from 0.05 to 5 μm. When the photosensitive layer is a dispersion system, the azo compound preferably has a particle size of not more than 5 μm, more preferably not more than 1 μm.

Examples of the electrically conductive support used in the photoreceptor of the present invention include metal plates or paper or plastic films made conductive by being coated, vapor-deposited or laminated with conductive polymers, conductive compounds such as indium oxide, or metal foils such as aluminum, palladium and gold. The intermediate layer such as bonding layer or barrier layer may be formed of the high-molecular polymers above listed as binders, as well as of organic polymers (e.g. gelatin, casein, starch, polyvinyl alcohol, ethyl cellulose and carboxymethyl cellulose) and aluminum oxide.

Useful azo compounds of formula (I) or (II) are listed below by reference to their structural formulae, and it is to be understood that the azo compounds that are included in the scope of the present invention are by no means limited to these examples.

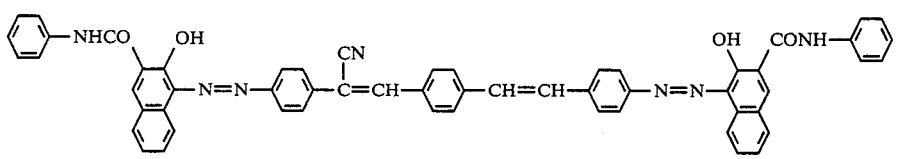

A-(

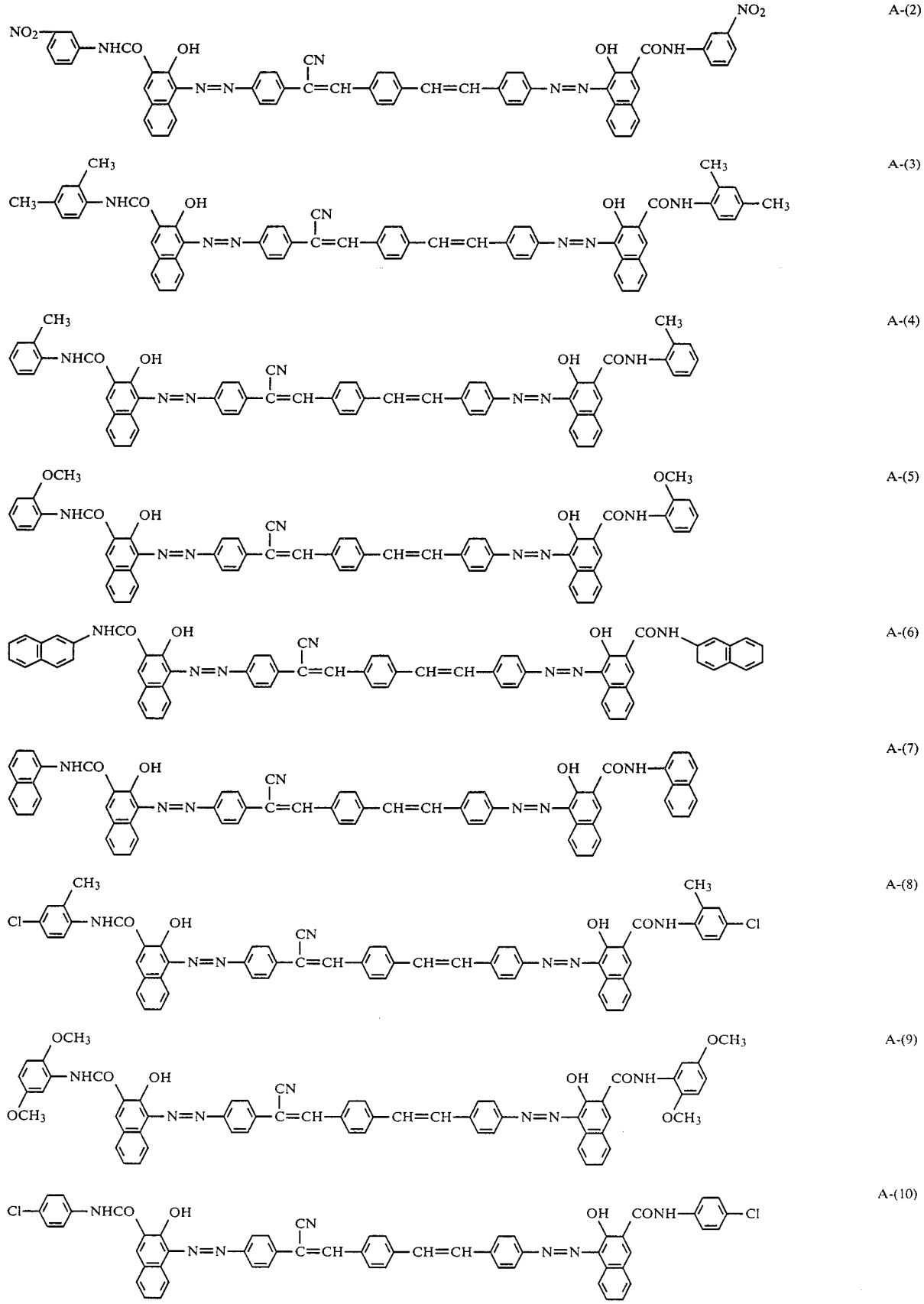

-continued
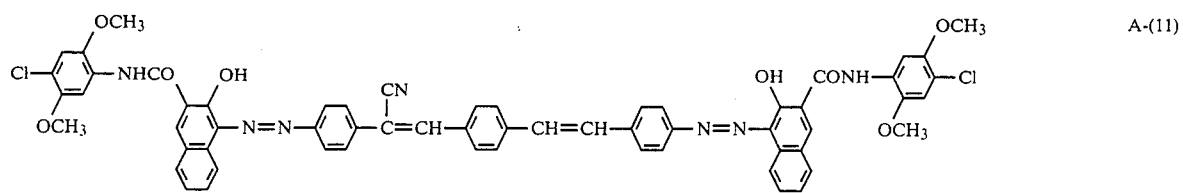 A-(11)
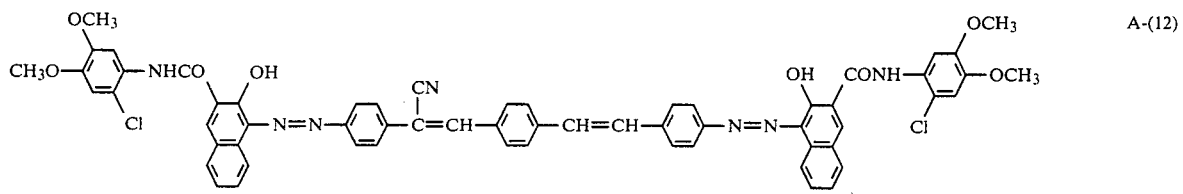 A-(12)
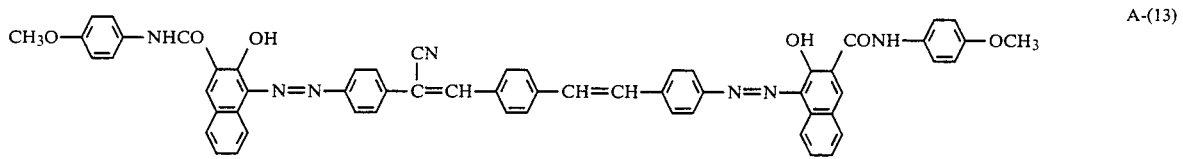 A-(13)
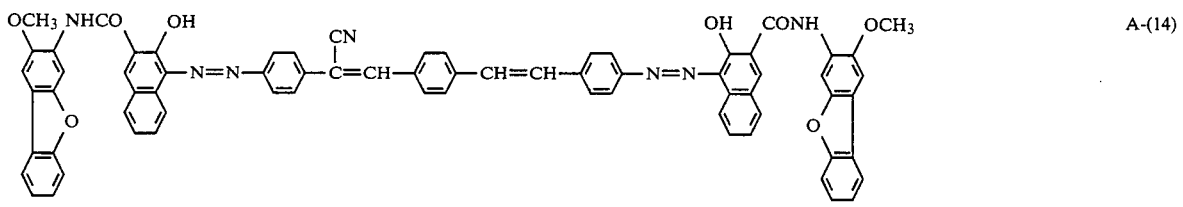 A-(14)
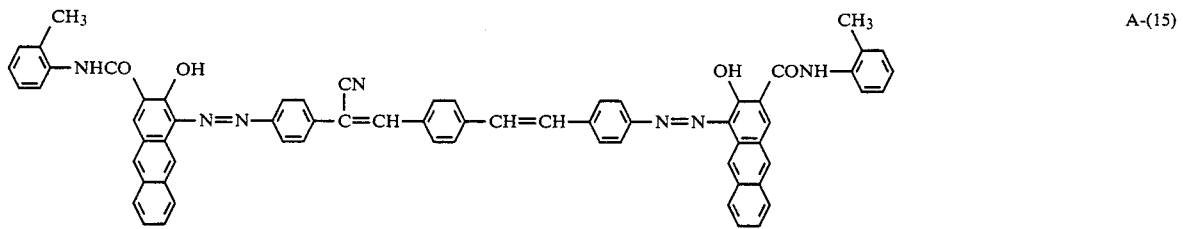 A-(15)
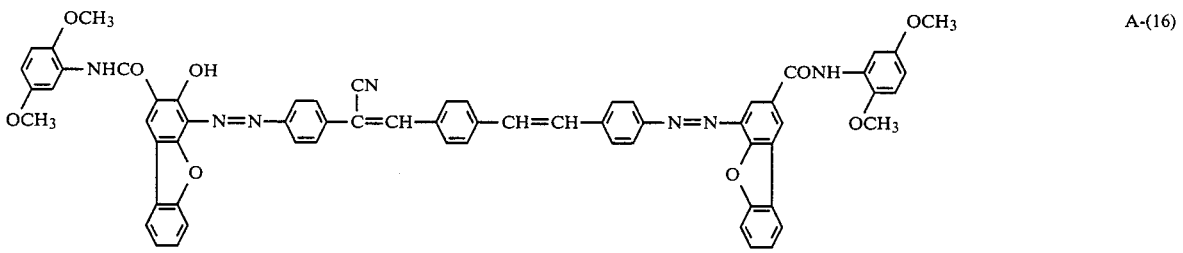 A-(16)
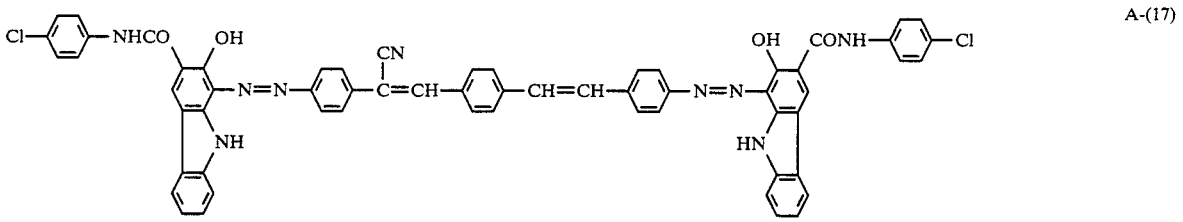 A-(17)

-continued
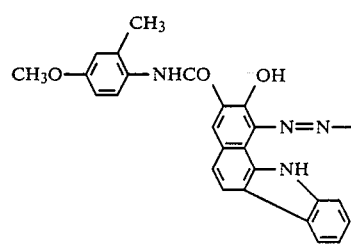
A-(18)
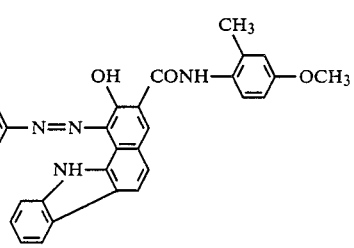
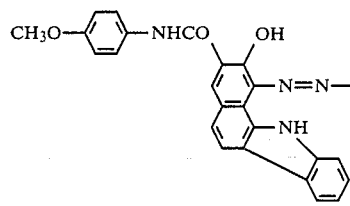
A-(19)
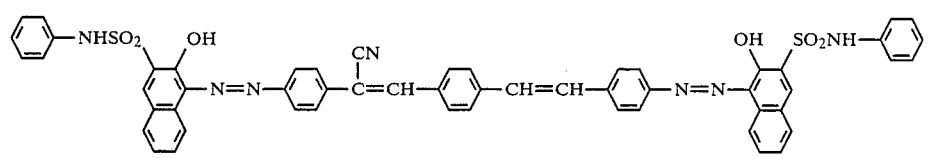
A-(20)
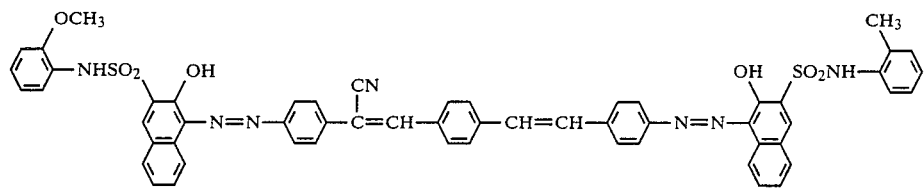
A-(21)
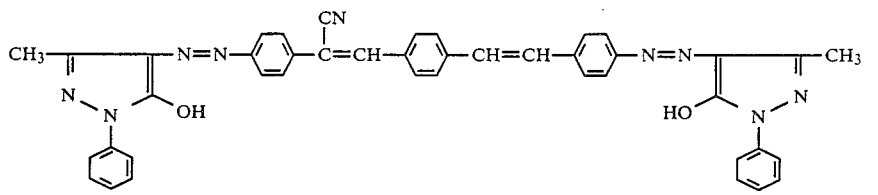
A-(22)
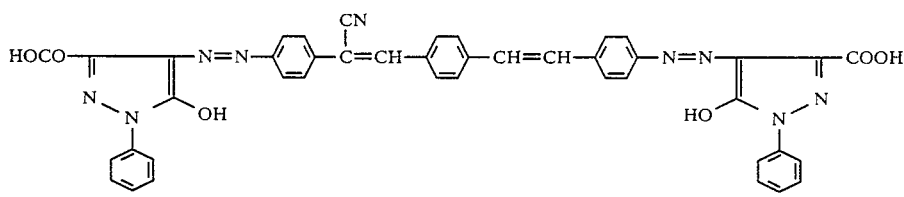
A-(23)
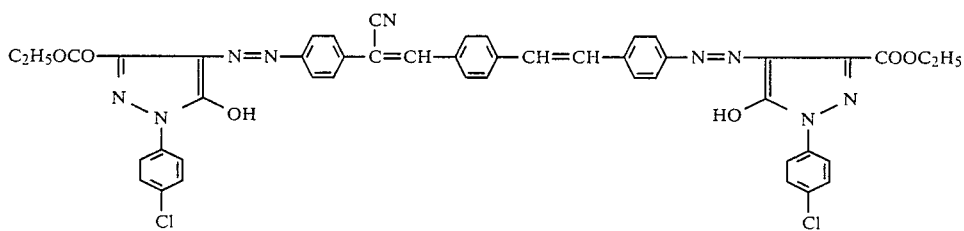
A-(24)
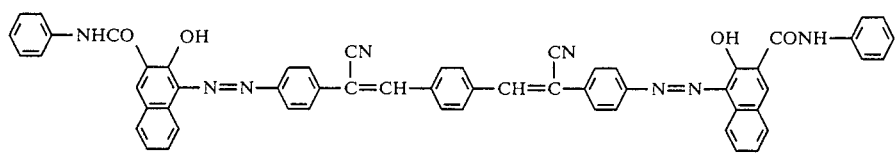
A-(25)

-continued
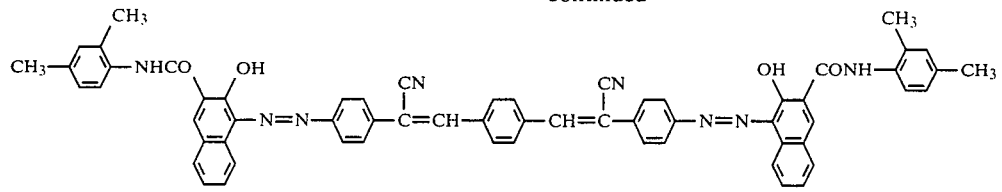
A-(26)
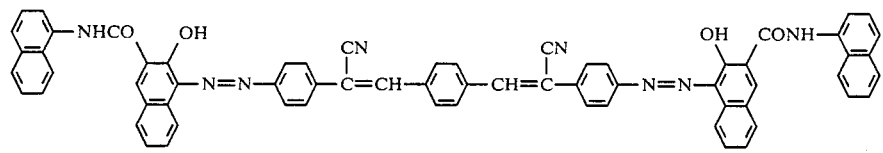
A-(27)
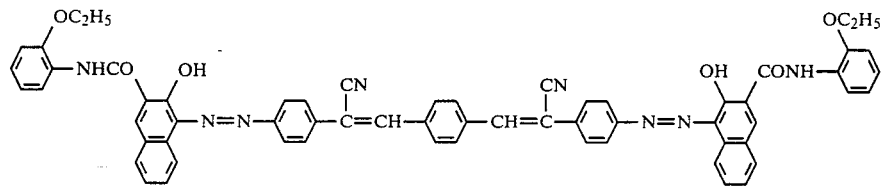
A-(28)
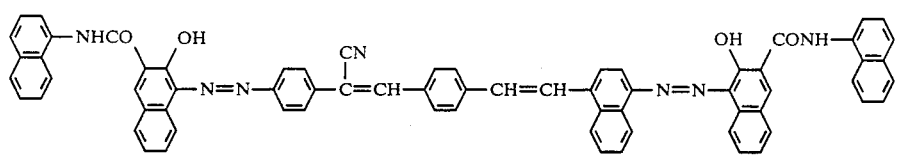
A-(29)
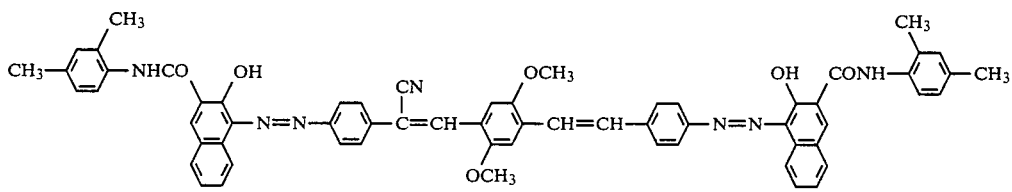
A-(30)
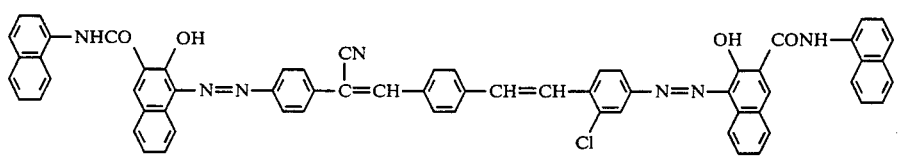
A-(31)
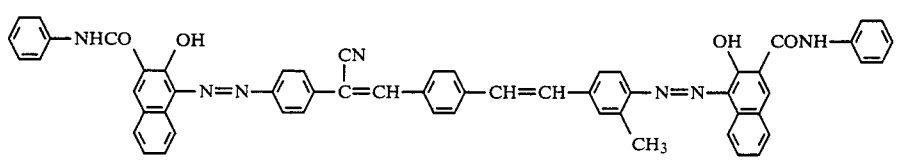
A-(32)
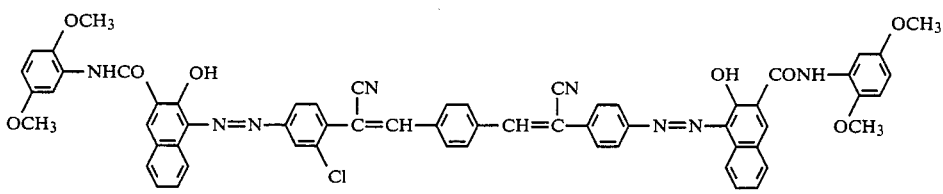
A-(33)
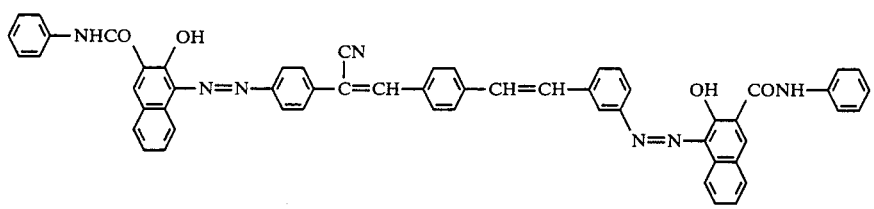
A-(34)

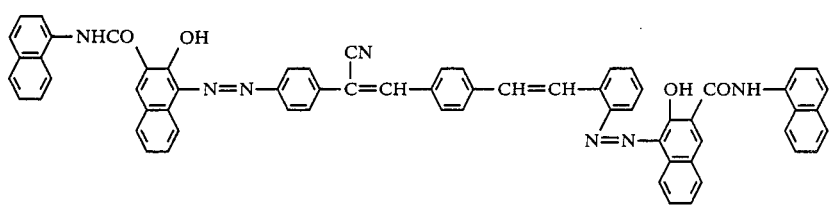 A-(35)
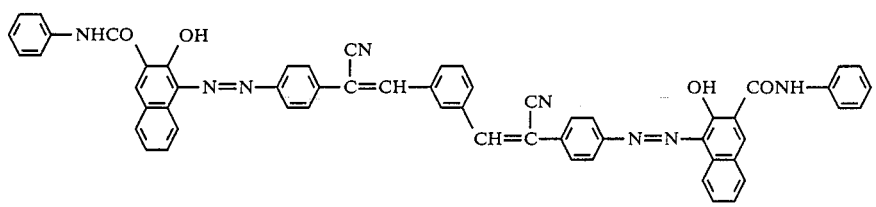 A-(36)
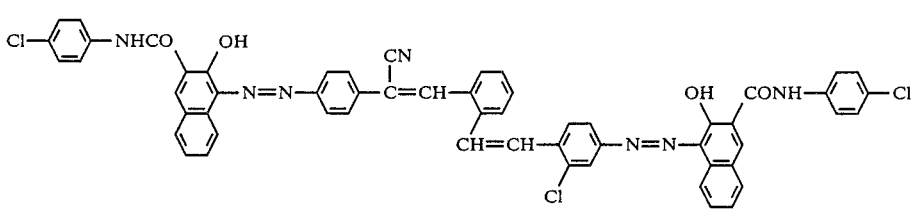 A-(37)
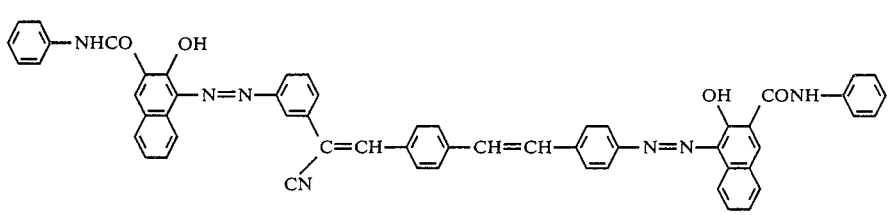 A-(38)
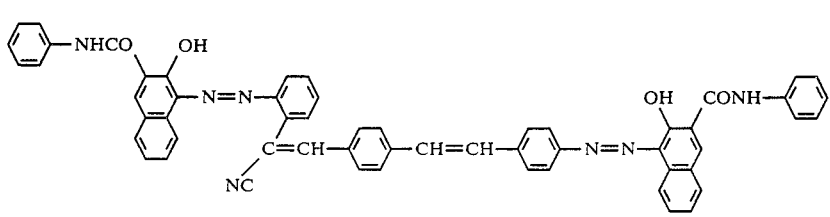 A-(39)
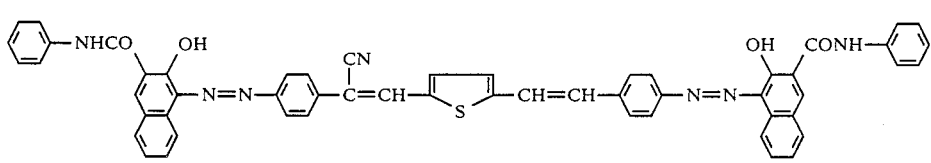 A-(40)
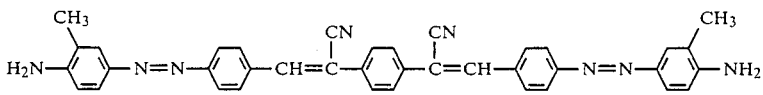 A-(41)
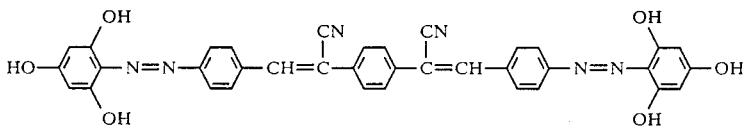 A-(42)
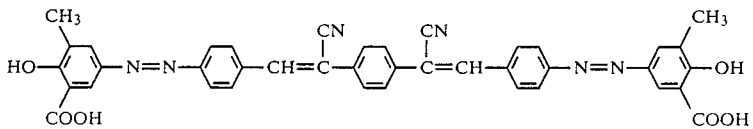 A-(43)

-continued
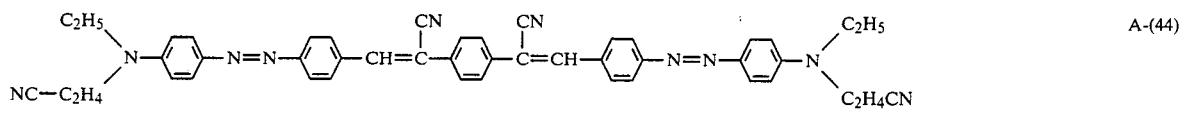 A-(44)
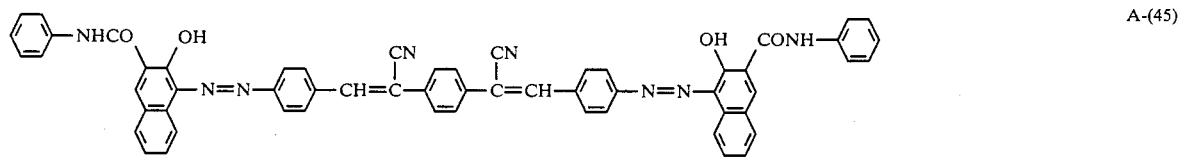 A-(45)
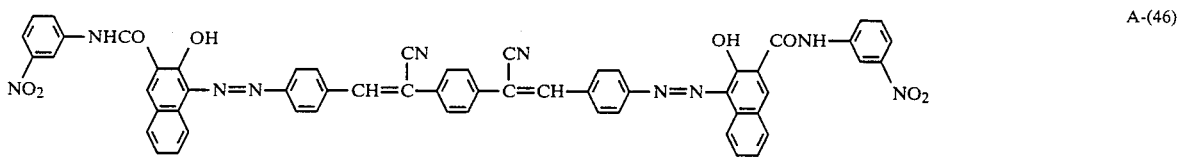 A-(46)
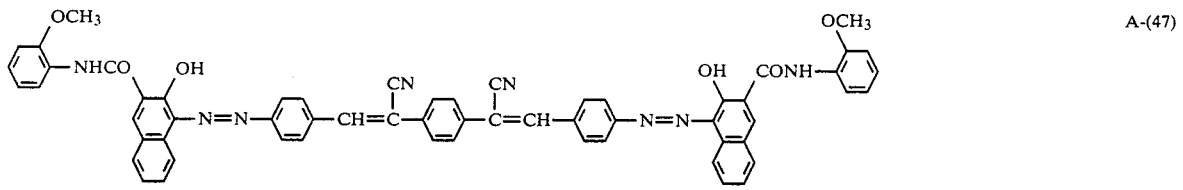 A-(47)
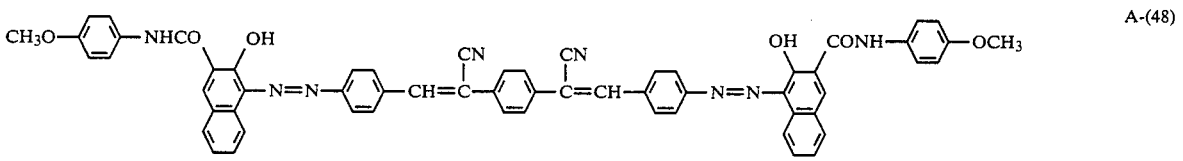 A-(48)
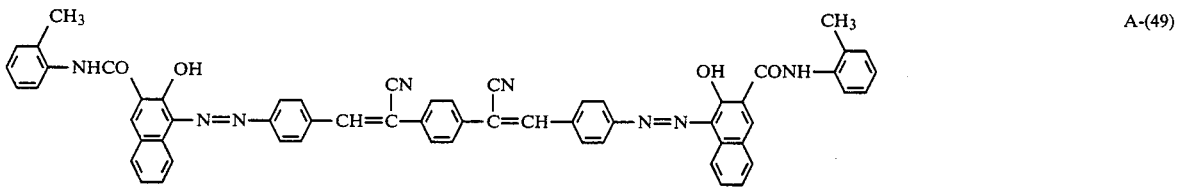 A-(49)
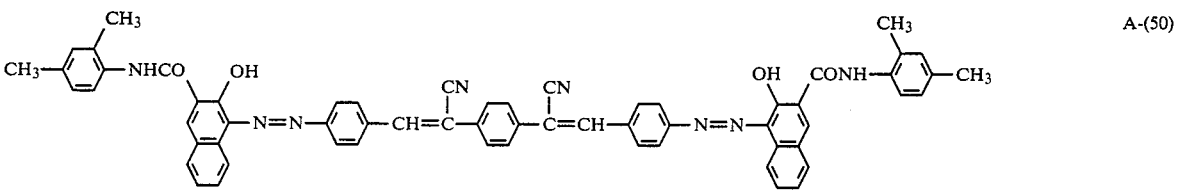 A-(50)
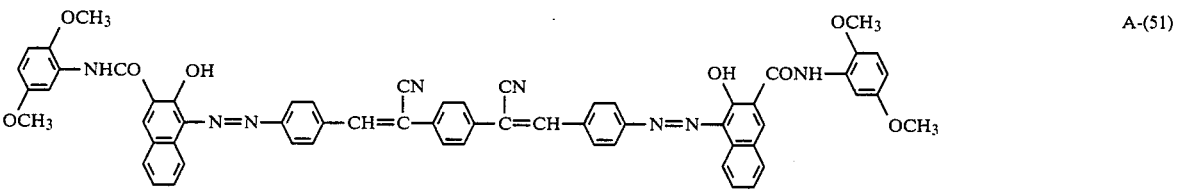 A-(51)
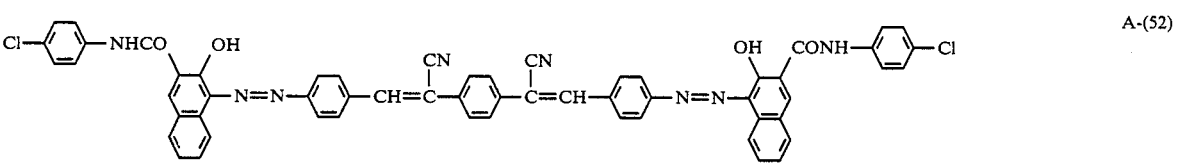 A-(52)

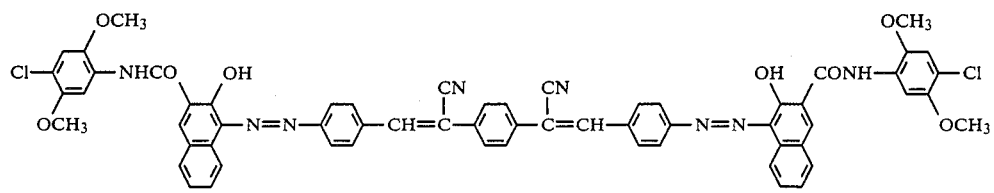
A-(53)
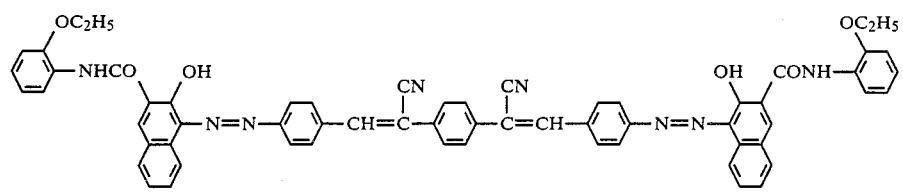
A-(54)
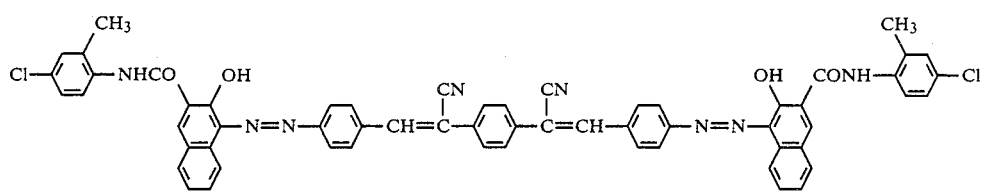
A-(55)
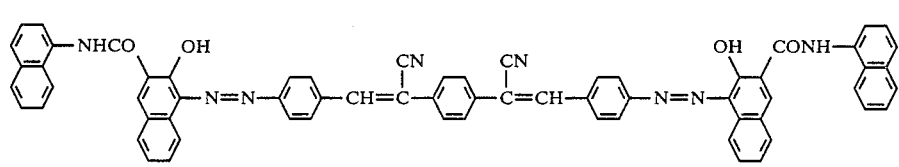
A-(56)
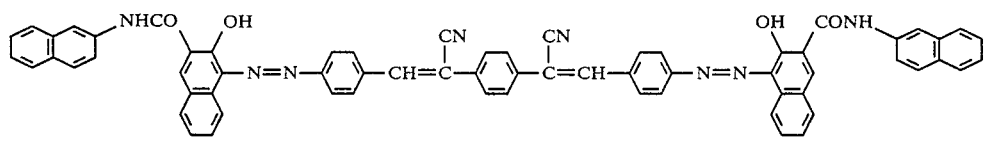
A-(57)
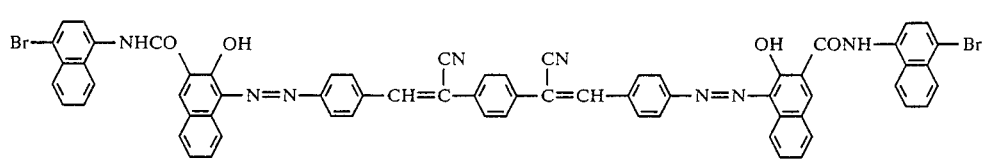
A-(58)
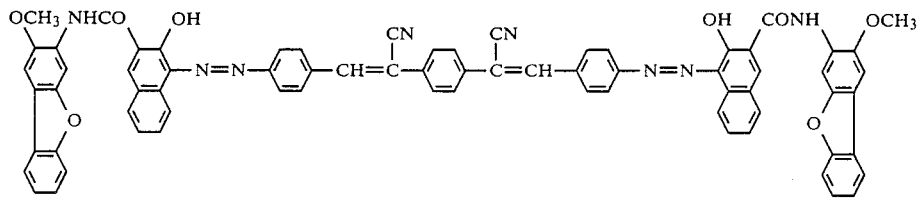
A-(59)
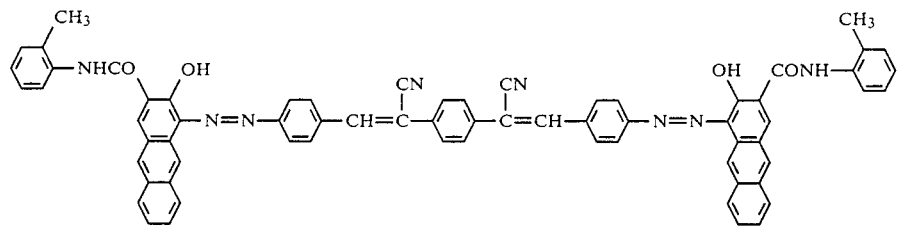
A-(60)

-continued
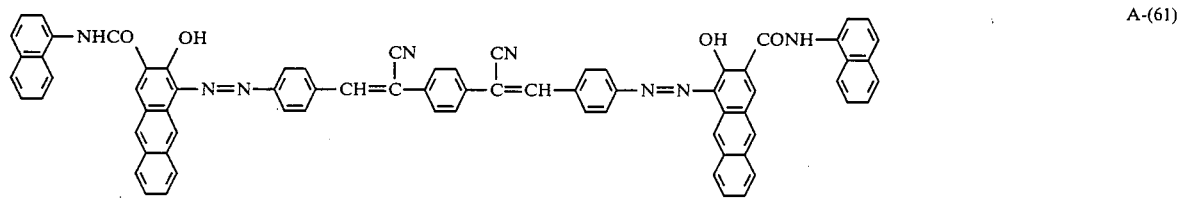
A-(61)
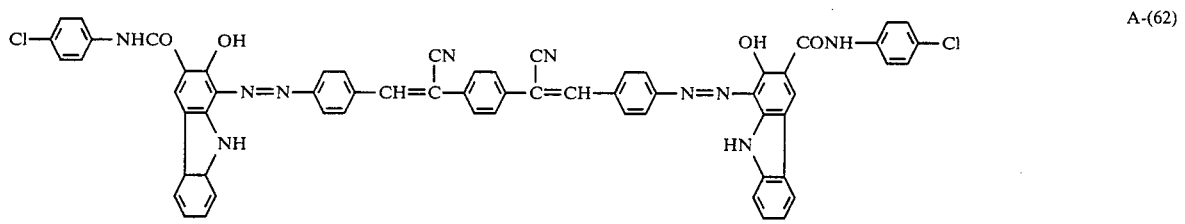
A-(62)
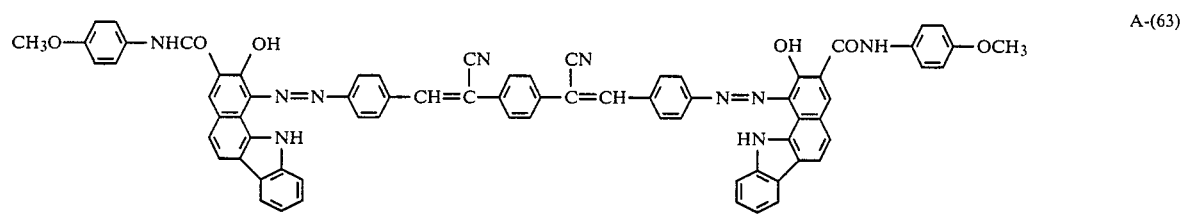
A-(63)
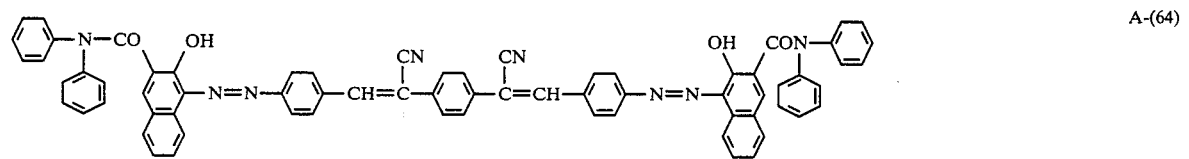
A-(64)
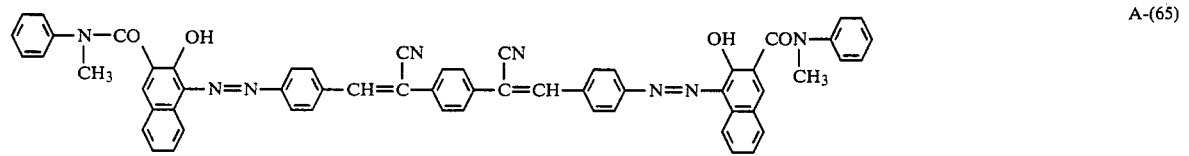
A-(65)
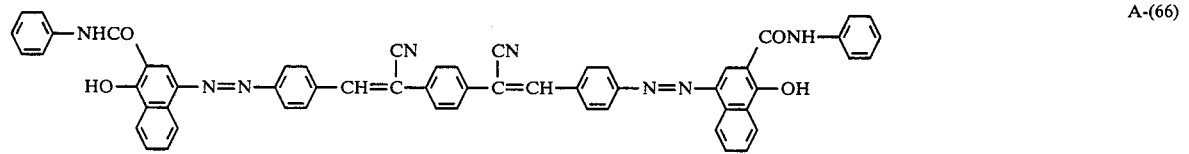
A-(66)
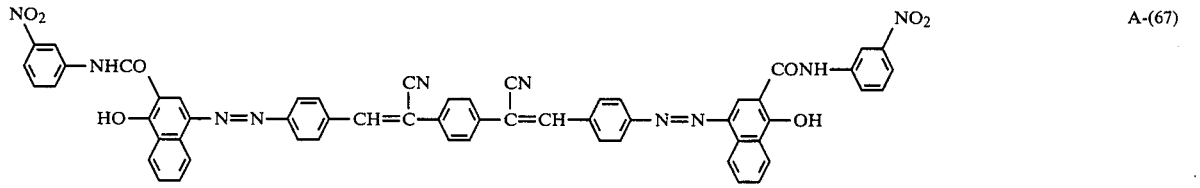
A-(67)
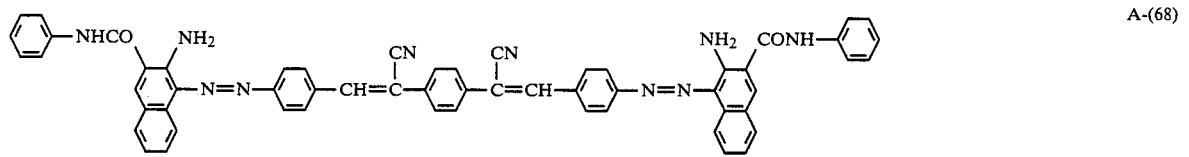
A-(68)

-continued
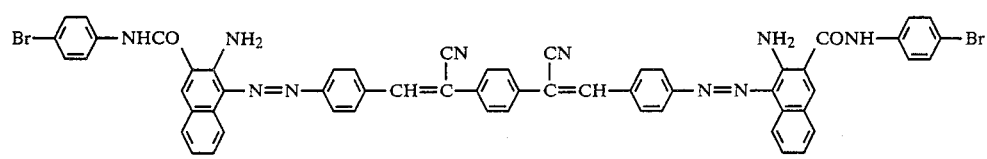
A-(69)
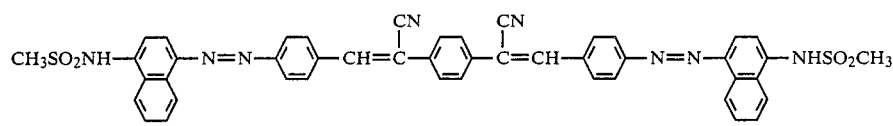
A-(70)
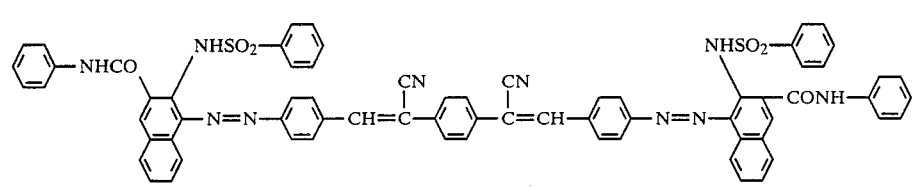
A-(71)
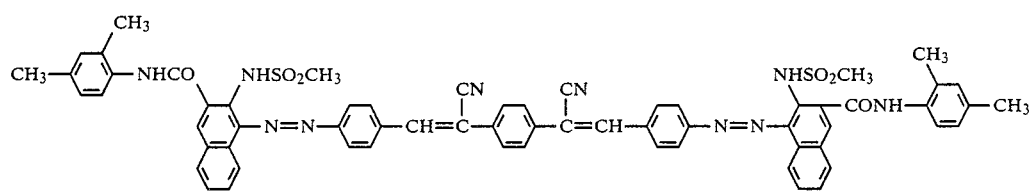
A-(72)
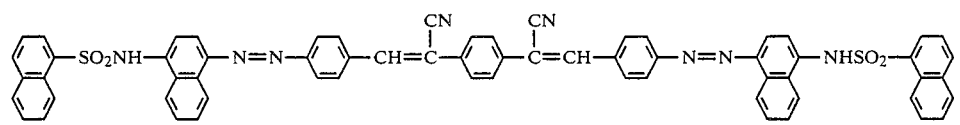
A-(73)
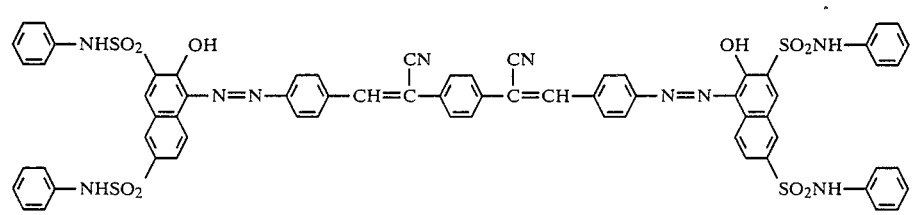
A-(74)
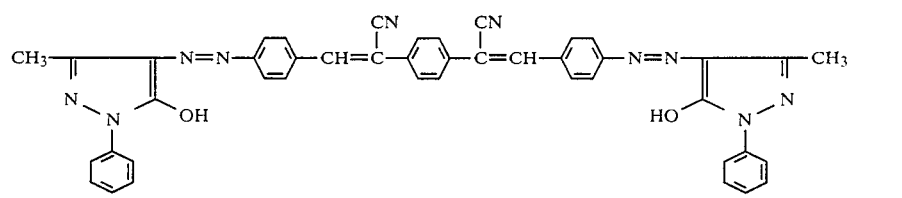
A-(75)
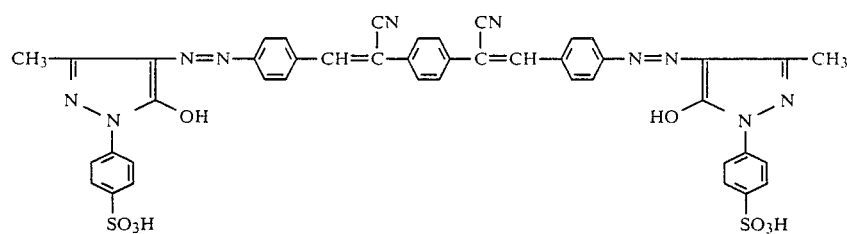
A-(76)

-continued
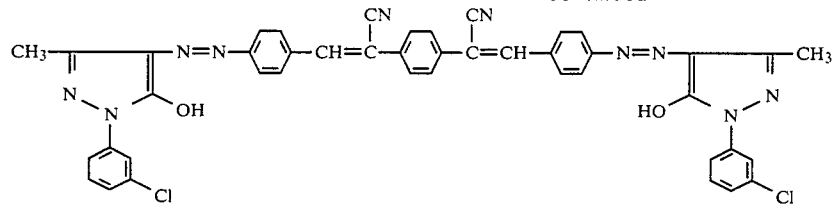 A-(77)
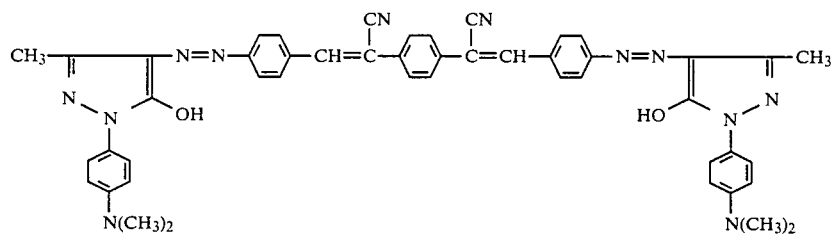 A-(78)
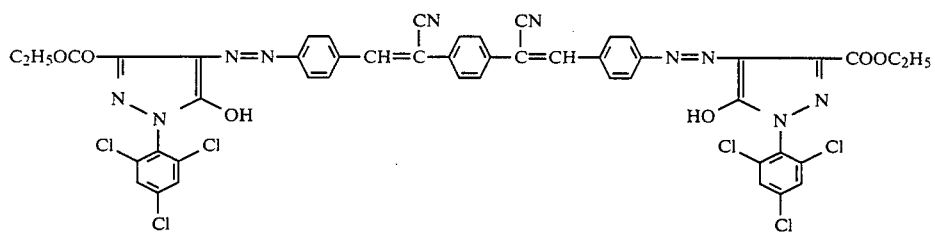 A-(79)
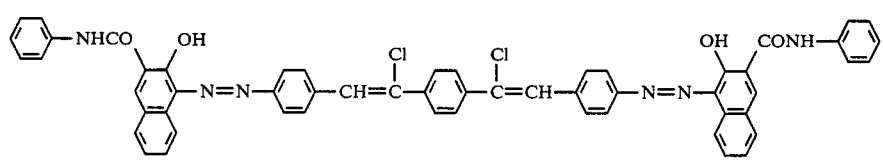 A-(80)
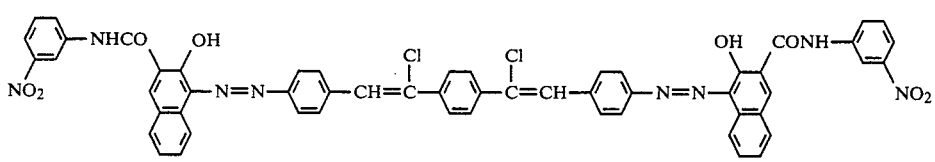 A-(81)
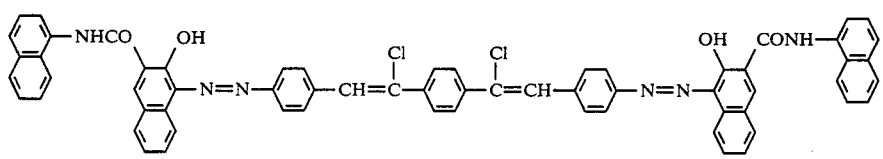 A-(82)
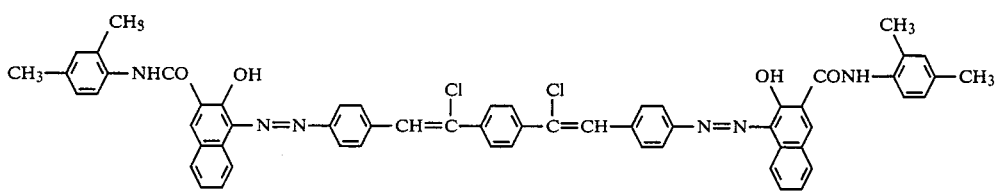 A-(83)
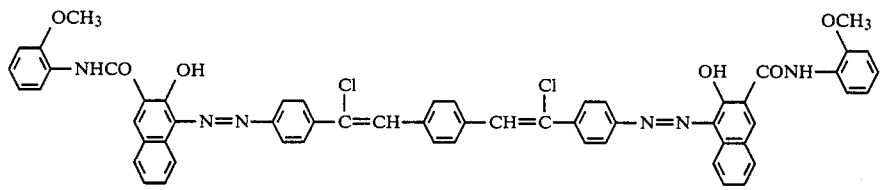 A-(84)

-continued
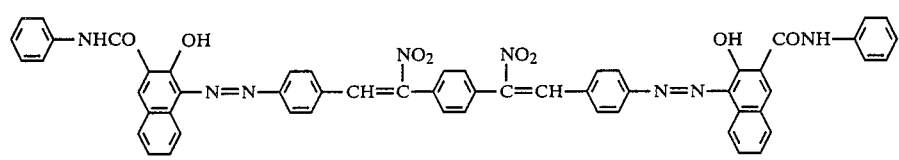
A-(85)
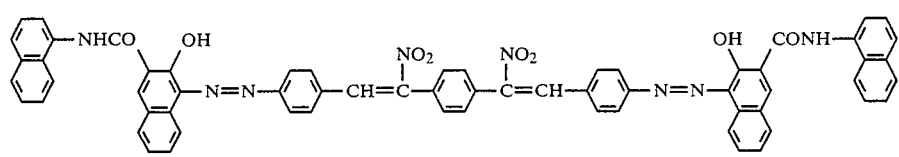
A-(86)
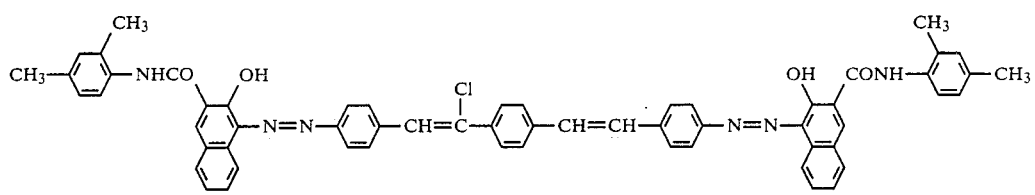
A-(87)
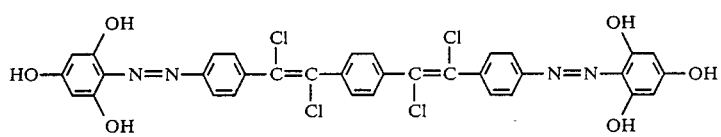
A-(88)
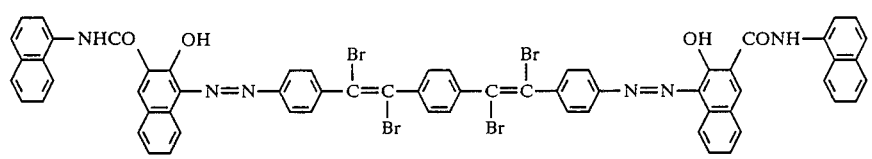
A-(89)
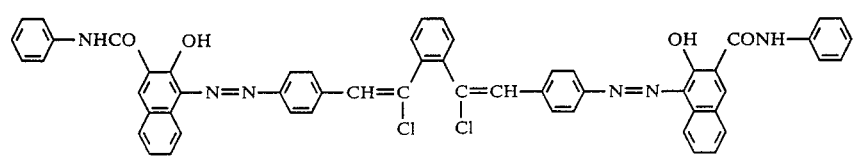
A-(90)
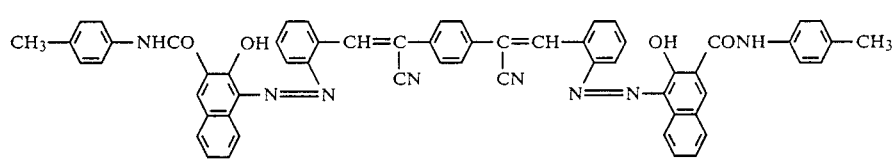
A-(91)
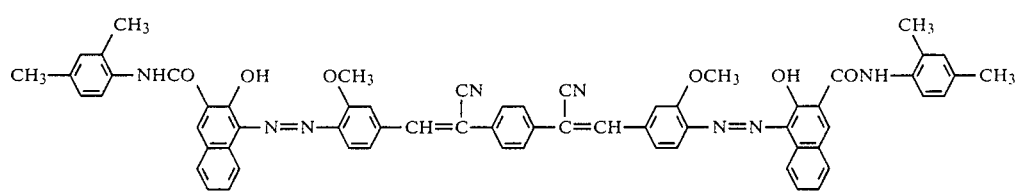
A-(92)
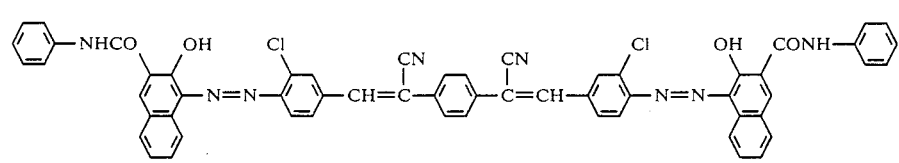
A-(93)

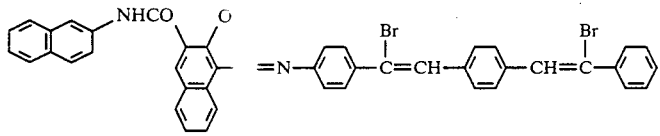
A-(111)
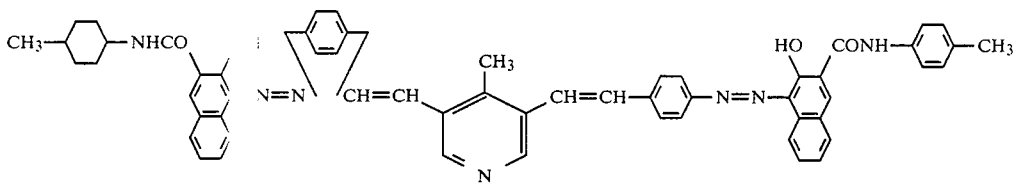
A-(112)
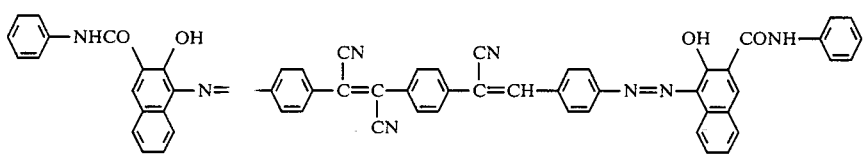
A-(113)
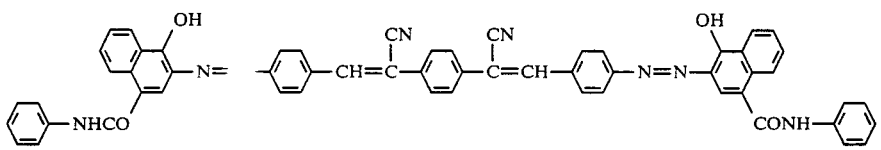
A-(114)
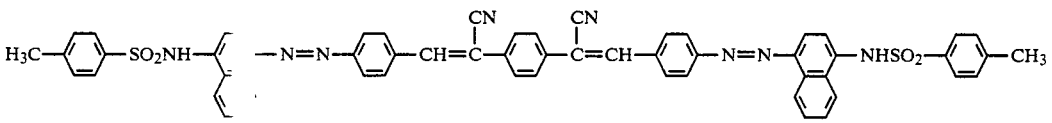
A-(115)
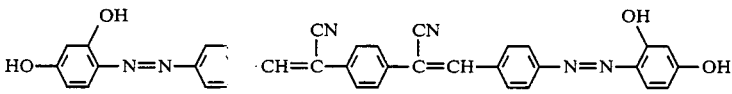
A-(116)
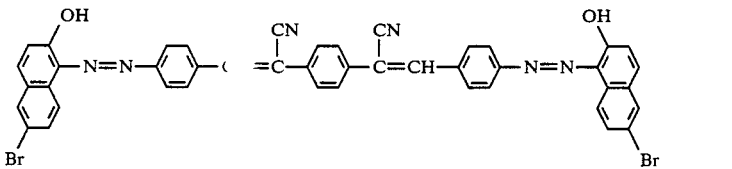
A-(117)
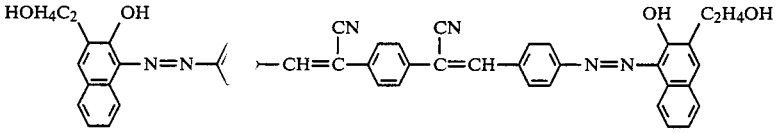
A-(118)
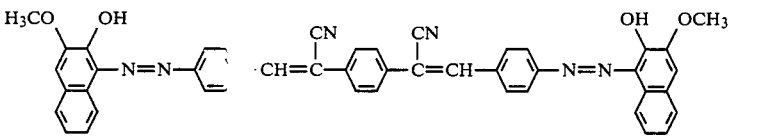
A-(119)
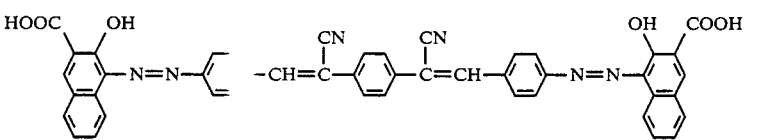
A-(120)
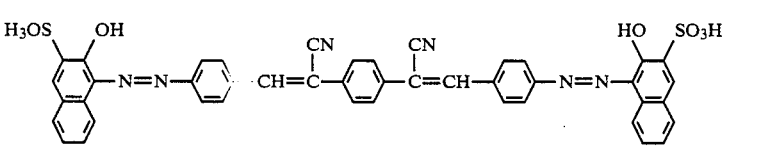
A-(121)

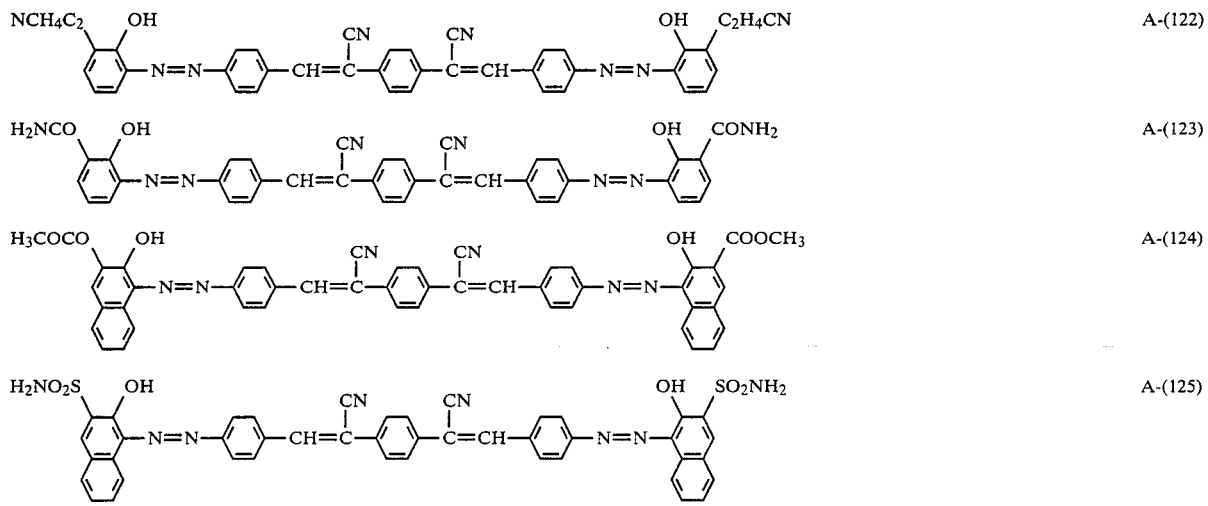

A-(122)

A-(123)

A-(124)

A-(125)

The methods of synthesizing some of these azo compounds are illustrated below.

Synthesis 1 (Compound A-(1))

1-(p-aminostyryl)-4-(p-amino-β-cyanostyryl)benzene was prepared by reducing 1-(p-nitrostyryl)-4-(p-nitro-β-cyanostyryl)benzene that was formed by condensing 4-nitro-4'-formylstillbene and p-nitrobenzyl cyanide in the presence of a basic catalyst according to a known method, e.g. the method described in Chemische Berichte, 34, p. 3104, 1901. 3.37 g (0.01 mol) of this diamino compound was dispersed in a mixture of concentrated hydrochloric acid (10 ml) and water (100 ml), and to the resulting dispersion, a solution of 1.4 g (0.02 mol) of sodium nitrite dissolved in water (8 ml) was added dropwise at 5° C. under cooling with ice. Then, the mixture was agitated for one hour under cooling with ice to complete the reaction. The insoluble matter was filtered off and 60 ml of 42% borofluoric acid was added to the filtrate. The resulting crystal was filtered, dried and dissolved in 150 ml of N,N-dimethylformamide, followed by removing the impurities to prepare a tetrazonium salt solution for use in the subsequent reaction.

A mixture of 5.27 g (0.02 mol) of 2-hydroxy-3-naphthoic acid anilide (Naphthol AS) and 5.6 g of triethanolamine was dissolved in 500 ml of N,N-dimethylformamide, and while the solution was held at 5° C. under cooling with ice, the previously prepared tetrazonium salt solution was added dropwise under vigorous agitation, and after the dropwise addition, the mixture was agitated for 2 more hours. The resulting crystal was filtered, and washed with 500 ml of N,N-dimethylformamide twice, then with 500 ml of acetone twice, and subsequently dried to produce 5.49 g of the end compound (yield: 62.0%). This compound was found identical to the compound titled A-(1) by the following data. IR spectrum: $\nu=1680$ cm$^{-1}$ (amide absorption) and $\nu=2220$ cm$^{-1}$ (nitrile absorption); FD-mass spectrum: peak of molecular ion at m/e=885; and Elemental analysis for $C_{57}H_{39}N_7O_4$:

|   | Calculated (%) | Found (%) |
|---|---|---|
| C | 77.27 | 77.01 |
| H | 4.44 | 4.54 |
| N | 11.07 | 11.36 |

The compound had a melting point of 300° C. or higher.

Synthesis 2 (Compound A-(26))

1,4-Bis(p-amino-β-cyanostyryl)benzene was prepared by reducing 1,4-bis(p-nitro-β-cyanostyryl)benzene which was formed by condensing terephthalaldehyde and p-nitrobenzylcyanide in the presence of a basic catalyst according to a known method. A solution of tetrazonium salt in N,N-dimethylformamide was prepared from 3.62 g (0.01 mol) of this diamino compound in a manner similar to that used in Synthesis 1.

Then, 5.83 g (0.02 mol) of 2-hydroxy-3-naphtoic acid m-xylidide (Naphthol AS-MX) was dissolved in 300 ml of N,N-dimethylformamide, and under cooling, the solution was mixed with the previously prepared tetrazonium salt solution. To the mixture, a solution of 5 g of sodium acetate in 40 ml of water was added dropwise at 5° C. or below under agitation.

Then, the mixture was agitated for two more hours at room temperature. The resulting crystal was filtered, washed with 500 ml of N,N-dimethylformamide twice, with 500 ml of water twice and finally with 500 ml of acetone twice to thereby produce 7.66 g of a crystal (yield: 79.2%). The product had the following data.

IR spectrum: $\nu=1680$ cm$^{-1}$ (amide absorption) and $\nu=2220$ cm$^{-1}$ (nitrile absorption).

FD-mass spectrum: peak molecular ion +1 at m/e=967; and Elemental analysis for $C_{62}H_{46}N_8O_4$:

|   | Calculated (%) | Found (%) |
|---|---|---|
| C | 77.00 | 76.81 |
| H | 4.79 | 4.88 |
| N | 11.59 | 11.76 |

This data shows that the product was identical to the compound titled A-(26), and it had a melting point of 300° C. or higher.

-continued
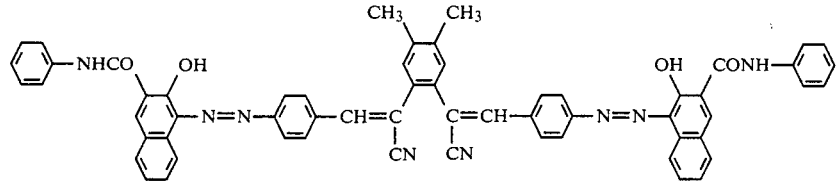 A-(94)
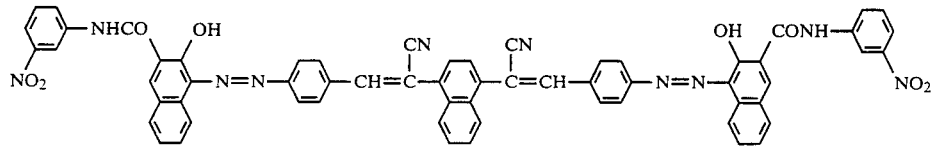 A-(95)
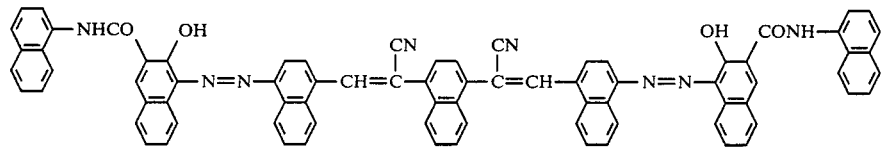 A-(96)
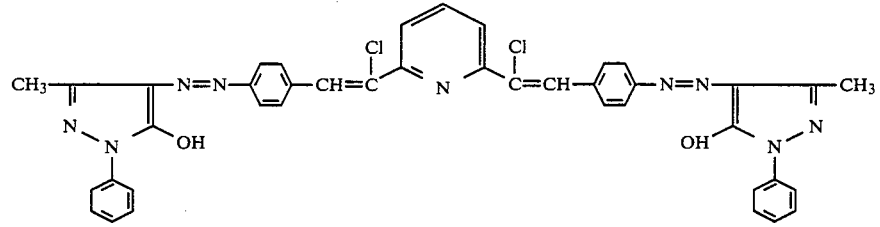 A-(97)
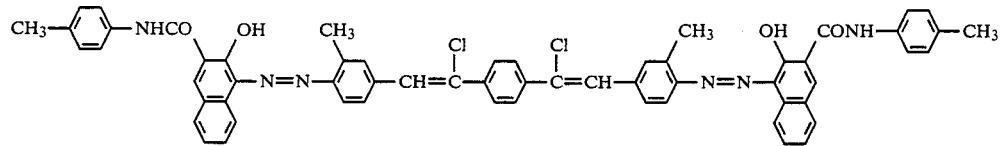 A-(98)
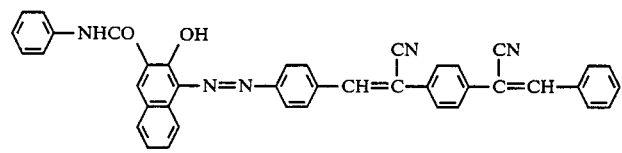 A-(99)
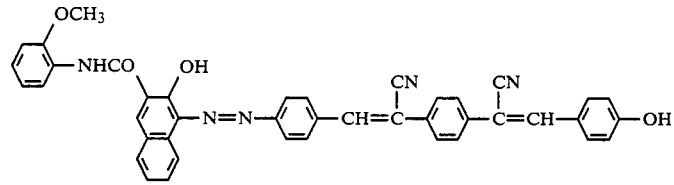 A-(100)
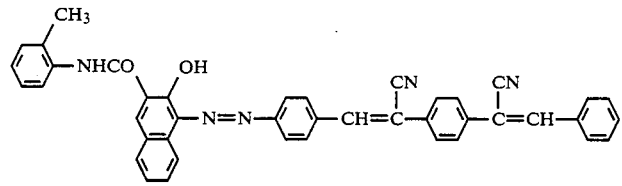 A-(101)

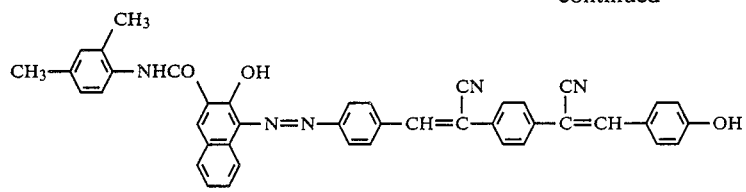
A-(102)
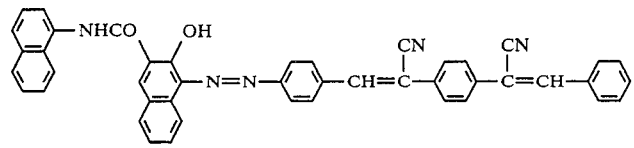
A-(103)
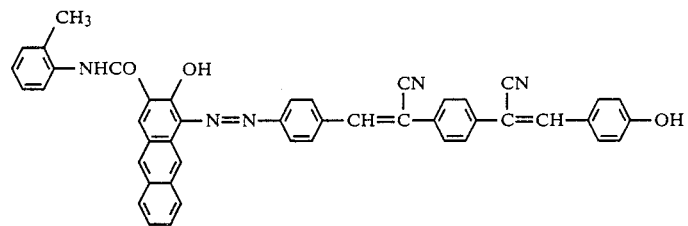
A-(104)
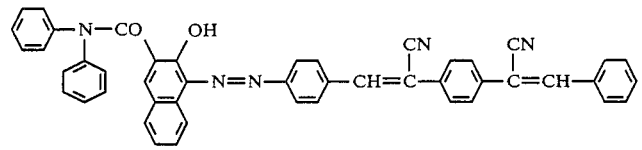
A-(105)
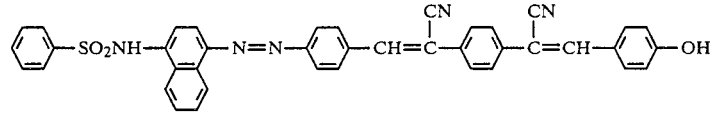
A-(106)
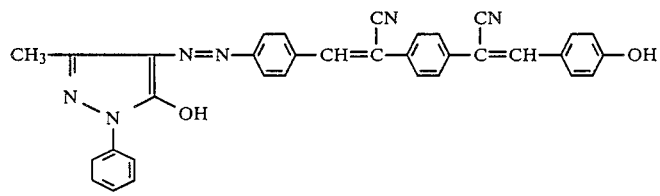
A-(107)
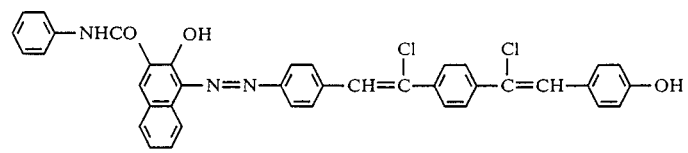
A-(108)
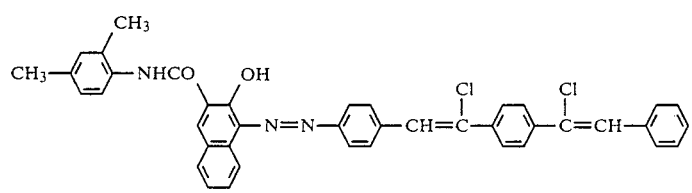
A-(109)
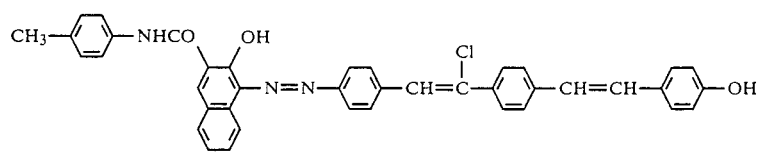
A-(110)

Synthesis 3 (Compound A-45))

18.1 g of (0.05 mol) of 1,4-bis(p-amino-α-cyanostyryl)benzene was dispersed in a mixture of 25 ml of concentrated hydrochloric acid and 400 ml of water, and to the dispersion, a solution of 6.9 g (0.1 mol) of sodium nitrite dissolved in 20 ml of water was added dropwise at 5° C. under cooling with ice. Then, the mixture was agitated for two hours under cooling with ice to complete the reaction. To the reaction liquor, a solution having 25 g of ammonium hexafluorophosphate dissolved in 250 ml of water was added, and the resulting crystal was filtered and dissolved in 800 ml of N,N-dimethylformamide, followed by removing the impurities to prepare a tetrazonium salt solution for use in the subsequent reaction.

The solution was added dropwise to a mixture of 26.3 g (0.1 mol) of 2-hydroxy-3-naphthoic acid anilide (Naphthol AS), 28 g of triethanolamine and 5000 ml of N,N-dimethylformamide under stirring for 2 hours to complete the reaction. Then, the resulting crystal was filtered, washed with 5000 ml of N,N-dimethylformamide, then with 3000 ml of acetone, and dried to produce 37.7 g of the end compound (yield: 82%). It had a melting point of 300° C. or higher and was found identical to the compound titled A-(45) by the following data.

IR spectrum $\nu = 1680$ cm$^{-1}$ (amide absorption) and $\nu = 2220$ cm$^{-1}$ (CN absorption); and FD-mass spectrum: peak of molecular ion at m/e=910.

Synthesis 4 (Compound A-(93))

3.4 g (0.01 mol) of 1-(p-amino-α-cyanostyryl)-4-α-cyanostyrylbenzene was dispersed in a mixture of 5 ml of concentrated hydrochloric acid and 40 ml of water, and to the dispersion, a solution having 0.69 g (0.01 mol) of sodium nitrite dissolved in 5 ml of water was added dropwise at 0° C. under cooling with ice. Then, the mixture was agitated for two hours under cooling with ice to complete the reaction. To the reaction mixture, a solution of 5 g of ammonium hexafluorophosphate dissolved in 50 ml of water was added, and the resulting crystal was filtered and dissolved in 150 ml of N,N-dimethylformamide, followed by removing the impurities to prepare a diazonium salt solution for use in the subsequent reaction.

The solution was added to a solution of 2.6 g (0.01 mol) of 2-hydroxy-3-naphthoic acid anilide (Naphthol AS) dissolved in 100 ml of N,N-dimethylformamide, and the mixture was held at 5° C. under cooling with ice while a solution of 5 sodium acetate in 40 ml of water was added dropwise. The reaction mixture was then agitated for two more hours at room temperature. The resulting crystal was filtered, washed with 500 ml of N,N-dimethylformamide, then with 1000 ml of water, and finally with 1000 ml of acetone to thereby produce 3.8 g of the end compound (yield: 61%). It had a melting point of 300° C. or higher and was found identical to the compound titled A-(93) by the following data:

IR spectrum: $\nu = 1680$ cm$^{-1}$ (amido absorption) and $\nu = 2220$ cm$^{-1}$ (CN absorption); and FD-mass spectrum: peak of molecular ion at m/e=621.

In the present invention, the azo compound of formula (I) or (II) can be used as a photoconductive material in a photosensitive layer. The compound has great carrier generating ability, so it can also be used as a carrier generation material in a function-separated photoreceptor wherein carriers are generated and transported by two different materials. By using such azo compound, a photoreceptor having good film-forming properties, great charge retention, high sensitivity and low residual potential can be produced. These photographic characteristics remain essentially constant (the photoreceptor is less fatigued) over repeated use and against exposure to heat or light.

These advantages of the present invention will become more obvious by reading the following examples to which the scope of the invention is by no means limited.

EXAMPLE 1

Two grams of compound A-(1) and 2 g of a polycarbonate resin, "Panlite L-1250" of Teijin Chemical Ltd. were dispersed in 110 ml of 1,2-dichloroethane over 12 hours with the aid of a ball mill. A carrier generation layer was formed by coating the dispersion in a dry thickness of 1 μm on a polyester film on which aluminum had been vapor-deposited. Six grams of 3-(p-methoxystyryl)-9-(p-methoxyphenyl)carbazole and 10 g of a polycarbonate resin, "Panlite L-1250" were dissolved in 110 ml of 1,2-dichloroethane, and the solution was coated as a carrier transport layer in a dry thickness of 15 μm onto the carrier generation layer.

The characteristics of the resulting photoreceptor were evaluated as follows with an electrostatic paper analizer Model SP-428 of Kawaguchi Electric Works, Ltd. The photoreceptor was charged to a negative voltage of 6 kV over a period of 5 seconds, left in the dark for 5 seconds, and exposed to a halogen lamp (light intensity on the surface of the photoreceptor: 35 lux) to measure its E½, i.e. the exposure required for the surface potential to drop to half its initial value. The same sample was exposed to 30 lux.sec and the resulting surface potential (residual potential) VR was measured. The two measurements were made 100 times, and the results are shown in Table 1:

TABLE 1

|  | 1st time | 100th time |
|---|---|---|
| E½ (lux · sec) | 1.8 | 1.8 |
| VR (V) | 0 | 0 |

COMPARATIVE EXAMPLE 1

A control sample of photoreceptor was prepared as in Example 1 except that the following bisazo compound was used as a carrier generation material.

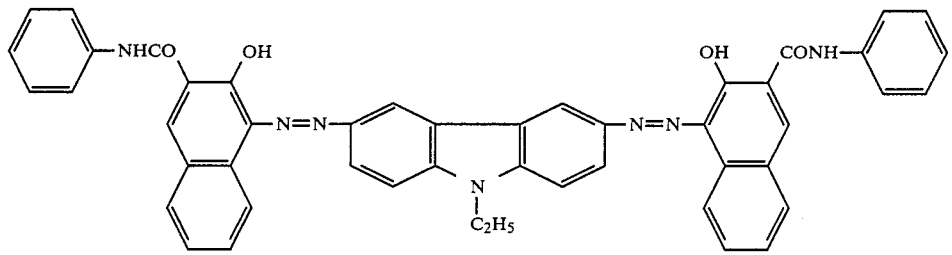

The sample was subjected to the same test as in Example 1, and the resuls are shown in Table 2 below.

TABLE 2

|  | 1st time | 2nd time |
|---|---|---|
| E½ (lux · sec) | 11.9 | 14.7 |
| VR (V) | −30 | −170 |

The above data shows that the photoreceptor of the present invention was much better than the control sample with respect to sensitivity, residual potential and stability against repeated use.

EXAMPLES 2 TO 4

Photoreceptors were prepared as in Example 1 except that compounds A-(3), A-(6) and A-(16) were used as carrier generation materials. They were subjected to the same test as in Example 1, and the results are shown in Table 3 below.

TABLE 3

| Ex. No. | Bisazo compound | 1st time E½ (lux · sec) | 1st time VR (V) | 100th time E½ (lux · sec) | 100th time VR (V) |
|---|---|---|---|---|---|
| 2 | A-(3) | 1.9 | 0 | 1.9 | 0 |
| 3 | A-(6) | 2.0 | 0 | 2.0 | 0 |
| 4 | A-(16) | 2.0 | 0 | 2.2 | −2 |

EXAMPLE 5

An electrically conductive support made of a polyester film laminated with an aluminum foil was coated with an intermediate layer 0.05 μm thick formed of a vinyl chloride-vinyl acetate-maleic anhydride copolymer, "S-lec MF-10" of Sekisui Chemical Co., Ltd. Two grams of compound A-(25) was dispersed in 110 ml of 1,2-dichloroethane over a period of 24 hours with the aid of a ball mill, and the dispersion was applied to the intermediate layer to form a carrier generating layer in a dry thickness of 0.5 μm. A solution of 6 g tri-p-tolylamine and 10 g of a methacrylic resin, "Acrypet" of Mistubishi Rayon Company Limited dissolved in 70 ml of 1,2-dichloroethane was coated onto the carrier generation layer to form a carrier transport layer in a dry thickness of 10 μm. The resulting photoreceptor was subjected to the same test as in Example 1. The results for the first run were: E½ = 2.0 lux. sec and VR = 0 V.

EXAMPLE 6

An electrically conductive support with an intermediate layer which was the same as used in Example 5 was coated with a carrier generation layer made by coating a 1% solution of compound A-(7) in ethylene diamine in a dry thickness of 0.3 μm. Six grams of 1-phenyl-3-(p-diethylaminostyryl)-5-(p-diethylaminophenyl)pyrazoline and 10 g of a polyester resin, "Vylon 200" of Toyobo Co. Ltd. were dissolved in 70 ml of 1,2-dichloroethane, and the solution was coated on the carrier generation layer to form a carrier transport layer in a dry thickness of 12 μm. The resulting photoreceptor was subjected to the same test as in Example 1 and the results are shown in Table 4.

COMPARATIVE EXAMPLE 2

A control sample of photoreceptor was prepared by repeating Example 6 except that compound A-(7) was replaced by the following bisazo compound. The sample was subjected to the same test as in Example 1, and the results are shown in Table 4 below.

TABLE 4

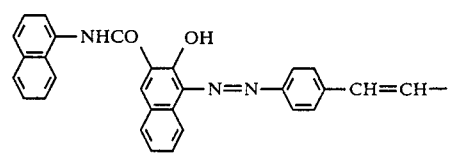

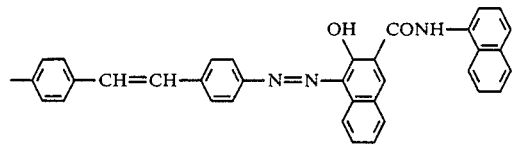

| Run No. | 1st time E½ (lux. sec) | 1st time VR (V) | 100th time E½ (lux. sec) | 100th time VR (V) |
|---|---|---|---|---|
| Ex. 6 | 1.9 | 0 | 1.9 | 0 |
| Comp. Ex. 2 | 3.8 | 0 | 4.2 | −2.0 |

EXAMPLE 7

A carrier generation layer was formed as in Example 5 except that compound A-(25) was replaced by compound A-(19). Six grams of 1,2-bis(p-N,N-dibenzylaminophenyl)butane and 10 g of a polycarbonate resin. "Panlite L-1250" of Teijin Chemicals Ltd. were dissolved in 70 ml of 1,2-dichloroethane, and the solution was applied to the carrier generation layer to form a carrier transport layer in a dry thickness of 10 μm. The resulting photoreceptor was subjected to the same test as in Example 1. The results for the first run were: E½ = 2.4 lux. sec. and VR = 0 V.

EXAMPLE 8

An intermediate layer 0.05 μm thick made of a vinyl chloride-vinyl acetate-maleic anhydride copolymer, "S-lec MF-10" of Sekisui Chemical Co., Ltd. was formed on the surface of an aluminum drum having a diameter of 100 mm. Four grams of compound A-(2) was dispersed in 400 ml of 1,2-dichloroethane over a period of 24 hours with the aid of a ball mill, and the dispersion was applied to the intermediate layer to form a carrier generation layer in a dry thickness of 0.6 μm. Thirty grams of N,N-diethylaminobenzaldehyde-1,1-diphenylhydrazone having the following formula and 50 g of a polycarbonate resin, "Jupilon S-1000" of Mitsubishi Gas Chemical Company Inc. were dissolved in 400 ml of 1,2-dichloroethane, and the solution was applied to the carrier generation layer to form a carrier transport layer in a dry thickness of 13 μm.

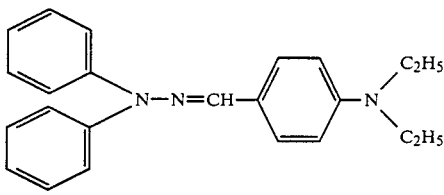

The resulting drum-shaped photoreceptor was set on a modified "U-Bix V2", an electrophoto copier of Konishiroku Photo Industry Co., Ltd. and subjected to a copying test. Sharp copies having high contrast and faithful to the original image were produced, and the same result was obtained with the 1000th copy.

COMPARATIVE EXAMPLE 3

A control sample of drum-shaped photoreceptor was prepared as in Example 8 except that compound A-(2) was replaced by a bisazo compound of the formula listed below. The sample was subjected to the same copying test as in Example 8, but only foggy images were produced. In addition, as more copies were made, the contrast decreased, and the image on the 2000th copy was hardly visible.

resin, "Vyron 200" of Toyobo Co., Ltd. were dissolved in 70 ml of 1,2-dichloroethane, and the solution was applied to a polyester film with a vapor-deposited aluminum layer to form a carrier transport layer in a dry thickness of 10 μm. One gram of compound A-(6) and 1 g of compound A-(7) were dispersed in 110 ml of 1,2-dichloroethane over a period of 24 hours with the aid of a ball mill, and the dispersion was coated on the carrier transport layer to form a carrier generating layer in a dry thickness of 0.5 μm. The resulting photoreceptor was subjected to the same test as in Example 9. The results for the first run were: $E_{\frac{1}{2}} = 3.6$ lux.sec and VR = +10 V.

EXAMPLE 11

An electrically conductive support made of a polyester film laminated with an aluminum foil was coated with an intermediate layer 0.05 μm thick formed of a vinyl chloride-vinyl acetate-maleic anhydride copolymer, "S-lec MF-10" of Sekisui Chemical Co., Ltd. Two parts by weight of compound A-(45) was dispersed in 140 parts by weight of 1,2-dichloroethane, and the dispersion was coated onto the intermediate layer to form a carrier generating layer in a dry thickness of 0.5 μm. Six parts by weight of 1-phenyl-3-(p-diethylaminostyryl)-5-(p-diethylaminophenyl)pyrazoline and 10 parts by weight of a polyester resin, "Vylon 200" of Toyobo Co., Ltd. were dissolved in 90 parts by weight of 1,2-dichloroethane, and the solution was coated on the carrier generation layer to form a carrier transport layer in a dry thickness of 10 μm.

The characteristics of the resulting photoreceptor were evaluated by the dynamic method with an electrostatic paper analizer Model SP-428 of Kawaguchi Electric Works, Ltd. The photoreceptor was charged to a negative voltage of 6 kV over a period of 5 seconds, and

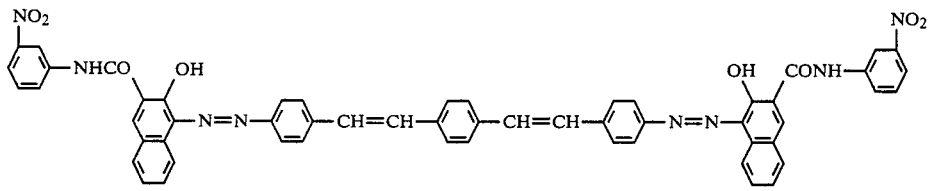

EXAMPLE 9

An electrically conductive support made of a polyester film laminated with an aluminum foil was coated with an intermediate layer 0.05 μm thick formed of a vinyl chloride-vinyl acetate-maleic anhydride copolymer, "S-lec MF-10" of Sekisui Chemical Co., Ltd. Five grams of compound A-(10) and 3.3 g of a polycarbonate resin, "Panlite L-1250" of Teijin Chemicals Ltd. were dispersed in 100 ml of dichloromethane over a period of 24 hours with the aid of a ball mill, and the dispersion was coated on the intermediate layer to form a photosensitive layer in a dry thickness of 10 μm. The resulting photoreceptor was subjected to the same test as in Example 1 except that the charging voltage was +6 kV. The results for the first run were: $E_{\frac{1}{2}} = 3.9$ lux.sec, and VR = +20 V.

EXAMPLE 10

Six grams of 1-phenyl-3-(p-diethylaminostyryl)-5-(p-diethylaminophenyl)purazoline and 10 g of a polyester the resulting surface potential VA was measured. The sample was illuminated with a halogen lamp (light intensity on the surface of the sample: 35 lux) to measure its $E_{\frac{1}{2}}$ (lux.sec), i.e. the exposure required for the surface potential VA to drop to half its initial value. The same sample of the photoreceptor was exposed to 30 lux.sec and the residual surface potential VR was measured. The three measurements were repeated 100 times, and the results are shown in Table 5.

TABLE 5

|  | 1st time | 100th time |
|---|---|---|
| VA (V) | −620 | −590 |
| E½ (lux · sec) | 1.5 | 1.6 |
| VR (V) | 0 | 0 |

COMPARATIVE EXAMPLE 4

A control sample of photoreceptor was prepared as in Example 11 except that the following bisazo compound was used as a carrier generation material.

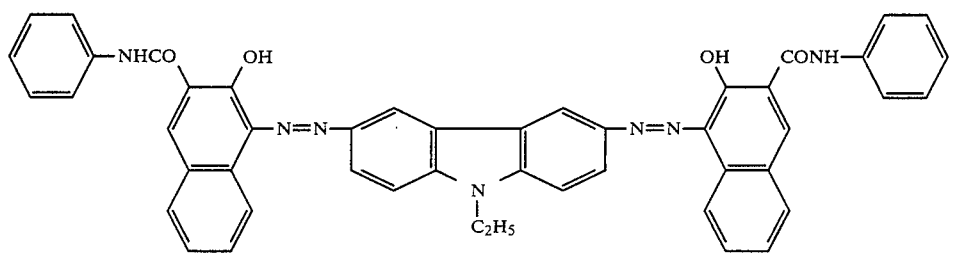

The sample was subjected to the same test as in Example 11 and the results are shown in Table 6 below.

TABLE 6

|  | 1st time | 100th time |
|---|---|---|
| VA (V) | −820 | −990 |
| E½ (lux · sec) | 13.1 | 14.5 |
| VR (V) | −40 | −210 |

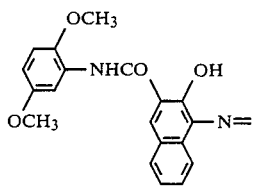 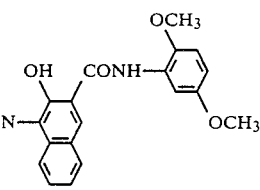

The above data shows that the photoreceptor of the present invention was much better than the control sample with respect to sensitivity, residual potential and stability against repeated use.

EXAMPLES 12 TO 14

Photoreceptors were prepared as in Example 11 except that compounds A-(47), A-(50) and A-(56) were used as carrier generation materials. They were subjected to the same test as in Example 11 and the results are shown in Table 7 below.

TABLE 7

| | 1st time | | | 100th time | | |
|---|---|---|---|---|---|---|
| Azo compounds | VA (V) | E½ (lux · sec) | VR (V) | VA (V) | E½ (lux · sec) | VR (V) |
| A-(47) | −670 | 1.8 | 0 | −635 | 2.0 | 0 |
| A-(50) | −800 | 1.9 | 0 | −760 | 2.0 | 0 |
| A-(56) | −680 | 1.6 | 0 | −630 | 1.8 | 0 |

EXAMPLE 15

A polyester film with a vapor-deposited aluminum layer was coated with an intermediate layer as in Example 11. Two parts by weight of compound A-(51) was dispersed in 140 parts by weight of 1,2-dichloroethane, and the dispersion was applied to the intermediate layer to form a carrier generation layer in a dry thickness of 0.5 μm. Six parts by weight of 1,1-bis(p-N,N-dibenzylaminophenyl)butane and 10 parts by weight of a polycarbonate resin, "Panlite L-1250" of Teijin Chemicals Ltd., were dispersed in 90 parts by weight of 1,2-dichloroethane, and the solution was applied to the carrier generation layer to form a carrier transport layer in a dry thickness of 10 μm. The resulting photoreceptor was subjected to the same test as in Example 11. The results for the first run were: VA = −925 V, E½ = 2.2 lux.sec, and VR = 0 V.

COMPARATIVE EXAMPLE 5

A control sample of photoreceptor was prepared as in Example 15 except that the following azo compound was used as a carrier generation material.

The sample was subjected to the same test as in Example 11. The results for the first run were: VA = −1120 V, E½ = 4.2 lux. sec, and VR = −15 V.

The above data shows that the photoreceptor of the present invention was much better than the control sample in respect of its initial characteristics, and this is probably due to the presence of an electron attractive group.

EXAMPLE 16

The photoreceptor of Example 15 and that of Comparative Example 5 were set in an electrophoto copier, "U-Bix 2000R" of Konishiroku Photo Industry Co., Ltd. and subjected to 2000 times of repeated charging, exposure and cleaning which constitute a copying process. Thereafter, the samples were subjected to the same evaluation as in Example 11, and the results are shown in Table 8 below.

TABLE 8

| | Characteristics after 2000 times of repeated copying | |
|---|---|---|
| | Sample of Ex. 15 | Sample of Comp. Ex. 5 |
| VA (V) | −880 | −1080 |
| E½ (lux · sec) | 2.7 | 6.9 |
| VR (V) | −5 | −65 |

The above data shows that the photoreceptor of Comparative Example 5 was much deteriorated after the copying test whereas the characteristics of the photoreceptor of Example 15 remained substantially the same even after it was subjected to 2000 times of repeated charging and exposure.

EXAMPLE 17

Two parts by weight of compound A-(81) and 2 parts by weight of a polycarbonate resin, "Pnalite L-1250" of Teijin Chemicals Ltd. were dispersed in 140 parts by weight of 1,2-dichloroethane, and the dispersion was coated on an electrically conductive support of the same type as used in Example 11 to thereby form a carrier generation layer in a dry thickness of 1.0 μm. Six parts by weight of tri-p-tolylamine and 10 parts by weight of a methacrylic resin, "Acrypet" of Mitsubishi Rayon Company Limited, were dissolved in 90 parts by weight of 1,2-dichloroethane, and the solution was coated on the carrier generation layer to form a carrier transport layer in a dry thickness of 10 μm. The resulting photoreceptor was subjected to the same test as in Example 11. The results for the first run were: $E_{\frac{1}{2}}=2.6$ lux.sec, and VR=0 V.

EXAMPLE 18

An electrically conductive support with an intermediate layer which was the same as used in Example 11 was coated with a carrier generating layer in a dry thickness of 0.3 μm made from a 2% solution of compound A-(95) in ethylenediamine. Six parts by weight of N,N-diethylaminobenzaldehyde-1,1-diphenylhydrazone of the following formula

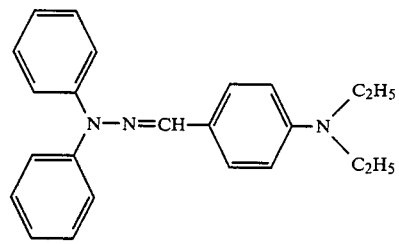

and 10 parts by weight of a polycarbonate resin, "Jupilon S-1000" of Mitsubishi Gas Chemical Company Inc. were dissolved in 90 parts by weight of 1,2-dichloroethane, and the solution was applied to the carrier generation layer to form a carrier transport layer in a dry thickness of 14 μm. The resulting photoreceptor was subjected to the same test as in Example 11. The results for the first run were: $E_{\frac{1}{2}}=2.4$ lux.sec, and VR=0 V. The photoreceptor was also subjected to a copying test with an electrophoto copier, "U-Bix 2000R" of Konishiroku Photo Industry Co., Ltd. Sharp copies having high contrast and good gradation characteristics and faithful to the original image were produced, and the same result was obtained with the 2000th copy.

COMPARATIVE EXAMPLE 6

A control sample of photoreceptor was prepared as in Example 18 except that the following azo compound was used as a carrier generation material.

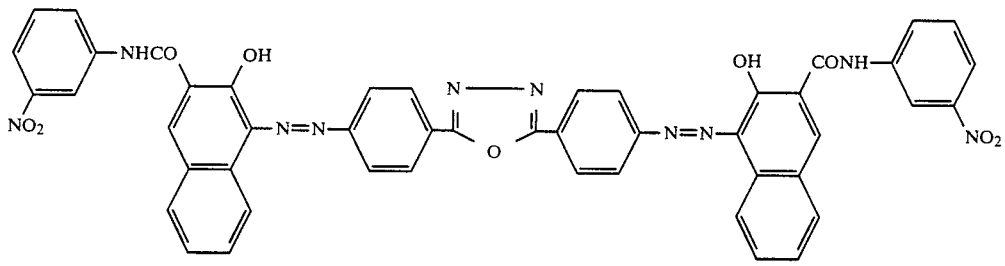

The control sample was subjected to the same copying test as in Example 18. The initial image was good, but as more copies were made, fog increased, and the 1000th copy only had a foggy, low-contrast image.

EXAMPLE 19

A polyester film having a vapor-deposited aluminum layer was coated with an intermediate layer 0.05 μm thick made from a vinyl chloride-vinyl acetate-maleic anhydride copolymer, "S-lec MF-10" of Sekisui Chemical Co., Ltd. Three parts by weight of compound A-(49), 6 parts by weight of 1,1-bis(4-N,N-diethylamino-2-methylphenyl)-1-phenylmethane and 10 parts by weight of a polycarbonate resin, "Panlite L-1250" of Teijin Chemicals Ltd. were dispersed in 100 parts by weight of 1,2-dichloroethane with the aid of a ball mill, and the dispersion was applied to the intermediate layer to form a photosensitive layer in a dry thickness of 10 μm. The characteristics of the resulting photoreceptor were measured by the dynamic method with an electrostatic paper analizer "Model" SP-428" of Kawaguchi Electrical Works, Ltd. The surface of the photoreceptor was charged to a positive voltage of 6 kV over a period of 5 seconds, and then was illuminated with a tungsten lamp (light intensity on the surface: 35 lux) to measure its $E_{\frac{1}{2}}$ which was found to be 4.1 lux.sec. The same sample of the same photoreceptor was exposed to 30 lux.sec and the residual surface potential VR was +12 V.

COMPARATIVE EXAMPLE 7

A control sample of photoreceptor was prepared as in Example 19 except that the following bisazo compound was used as a carrier generation material.

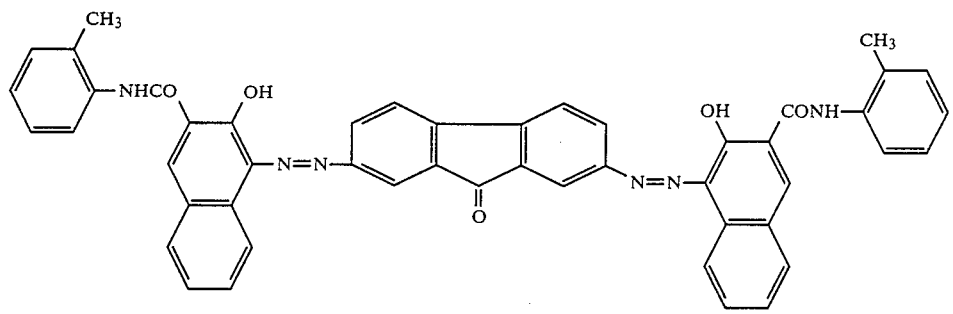

The sample was subjected to the same test as in Example 19, and the results for the first run were: $E_{\frac{1}{2}} = 12.4$ lux.sec and $VR = +84$ V. The control was much inferior to the sample of Example 19 in respect of sensitivity and residual potential.

EXAMPLE 20

An electrically conductive support with an intermediate layer which was the same as used in Example 11 was coated with a carrier generation layer formed in a dry thickness of 0.3 μm from a dispersion of 2 parts by weight of compound A-(56) in 100 parts by weight of 1,2-dichloroethane. Six parts by weight of a hydrazone derivative of the following formula

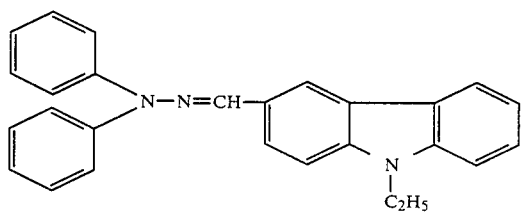

and 10 parts by weight of a polyester resin, "Vyron 200" of Toyobo Co., Ltd. were dissolved in 90 parts by weight of 1,2-dichloroethane, and the solution was applied to the carrier generation layer to form a carrier transport layer in a dry thickness of 12 μm. The resulting photoreceptor was subjected to the same test as in Example 11, and the results are shown in Table 9 below.

TABLE 9

|  | 1st time | 100th time |
| --- | --- | --- |
| VA (A) | −780 | −740 |
| $E_{\frac{1}{2}}$ (lux · sec) | 2.7 | 2.9 |

TABLE 9-continued

|  | 1st time | 100th time |
| --- | --- | --- |
| VR (V) | 0 | −10 |

COMPARATIVE EXAMPLE 8

A control sample of photoreceptor was prepared as in Example 20 except that the following bisazo compound was used as a carrier generation material.

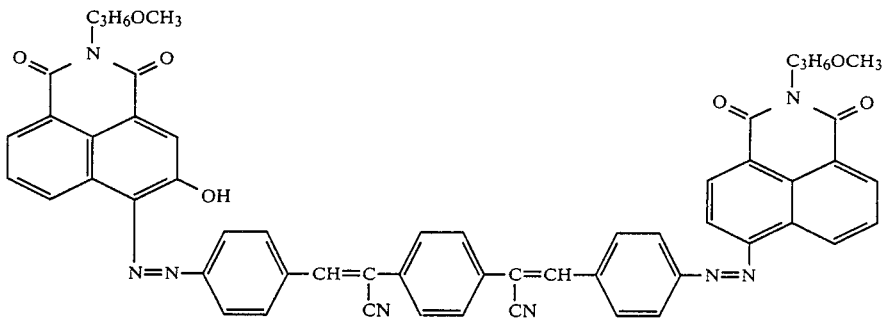

The control sample was subjected to the same test as in Example 11, and the results are shown in Table 10 below.

TABLE 10

|  | 1st time | 100th time |
| --- | --- | --- |
| VA (V) | −620 | −740 |
| $E_{\frac{1}{2}}$ (lux · sec) | 12.0 | 17.0 |
| VR (V) | −80 | −240 |

The above data shows that the photoreceptor of the present invention was far superior to the control sample in respect of its initial characteristics and stability to repeated use.

EXAMPLE 21

A photoreceptor was prepared as in Example 15 except that compound A-(102) was used as a carrier generation material. The product was subjected to the same test as in Example 11, and the results for the first run were: $E_{\frac{1}{2}} = 4.2$ lux.sec and $VR = -10$ V.

EXAMPLE 22

A photoreceptor was prepared as in Example 17 except that compound A-(81) was replaced by a mixture of one part by weight of compound A-(47) and an equal amount of compound A-(100). The product was subjected to the same test as in Example 11, and the results for the first run were: $E_{\frac{1}{2}} = 3.0$ lux.sec and $VR = -5$ V.

EXAMPLE 23

A photoreceptor was prepared as in Example 11 except that compound A-(63) was used as a carrier generation material. Its characteristics were measured as follows with an electrostatic paper analizer, "Model SP-428" of Kawaguchi Electric Works, Ltd. The surface of the photoreceptor was charged to a negative voltage of 6.0 kV over a period of 5 seconds, and then illuminated with a monochromatic light ($\lambda = 780$ nm, obtained by passing the light from a xenon lamp through a monochromator) to give a light energy of 0.02 mW/cm$^2$. The resulting sensitivity was 0.52 $\mu$J/cm$^2$ and the photoreceptor was found to be satisfactory for use in a semiconductor laser.

As the above data shows, the photoreceptor of the present invention has very good characteristics in respect of sensitivity, residual potential and stability against repeated use.

What is claimed is:

1. A photoreceptor for electrophotography comprising a conductive support and an overlaying photosensitive layer, said photosensitive layer containing a binder and at least one azo compound of Formula I or II

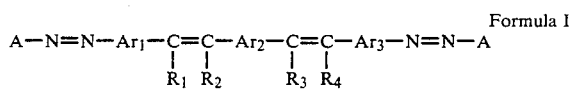

Formula I

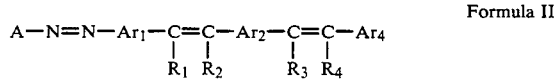

Formula II wherein $Ar_1$, $Ar_2$, $Ar_3$ and $Ar_4$ each is an aromatic hydrocarbon ring radical or an aromatic heterocyclic ring radical; $R_1$, $R_2$, $R_3$ and $R_4$ each is an electron attractive group or hydrogen provided that at least one of $R_1$, $R_2$, $R_3$ and $R_4$ is an electron attractive group; and A is

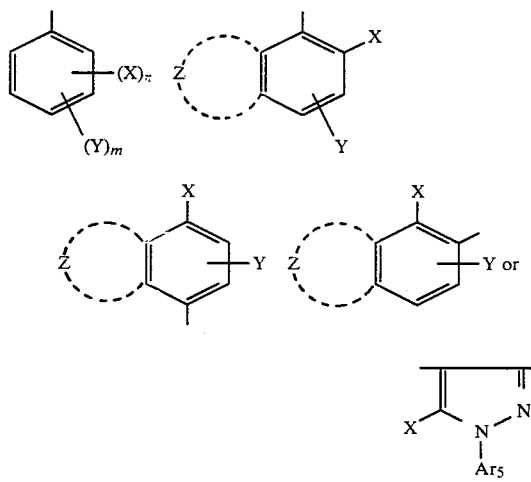

wherein X is a hydroxy group or a group represented by the formula:

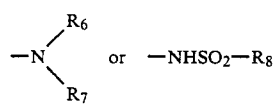

wherein $R_6$ and $R_7$ each is hydrogen or an alkyl group, and $R_8$ is an alkyl or aryl group; Y is halogen, an alkyl or alkoxy group, a carboxy group, a sulfo group, a carbamoyl or sulfamoyl group; Z is an atomic group necessary for making an aromatic hydrocarbon ring or an aromatic heterocyclic ring; $R_5$ is hydrogen, an amino or carbamoyl group, a carboxy group or an ester group thereof; $Ar_5$ is an aryl group; n is an integer of 1,2 or 3; and m is an integer of 0, 1 or 2.

2. A photoreceptor according to claim 1 wherein said electron attractive group is a cyano group, a nitro group or halogen.

3. A photoreceptor according to claim 1, wherein the photosensitive layer comprises a carrier transport material and a carrier generation material, said carrier generation material being an azo compound of Formula I or II.

4. A photoreceptor according to claim 3, wherein the photosensitive layer consists essentially of two layers, one containing the carrier transport material and the other containing the carrier generation material.

5. A photoreceptor according to claim 3, wherein the photosensitive layer consists essentially of a matrix containing the carrier transport material and particles of the carrier generation material dispersed in said matrix.

6. A photoreceptor according to claim 4 or 5 wherein an intermediate layer is formed between the conductive support and the photosensitive layer.

7. The photoreceptor of claim 1 wherein said azo compound is selected from the group consisting of Formulas III-1 to III-3

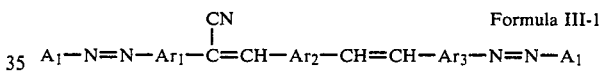

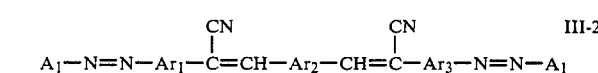

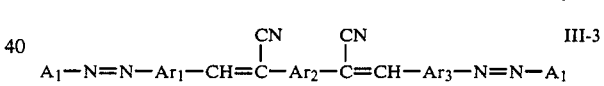

wherein $A_1$ is

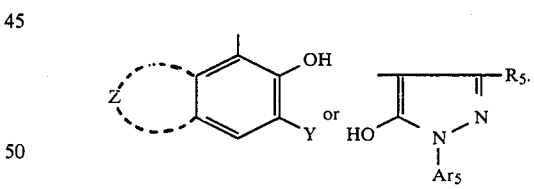

8. The photoreceptor of claim 7 wherein said azo compound is selected from the group consisting of Formula IV-1 to IV-3

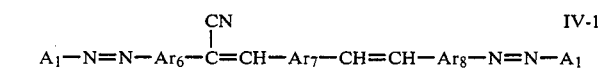

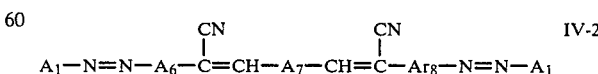

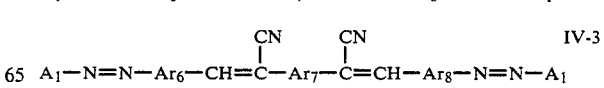

wherein $Ar_6$, $Ar_7$ and $Ar_8$ is each a divalent phenyl group.

9. The photoreceptor of claim 8 wherein said azo compound is selected from the group consisting of Formula V-1 to V-3

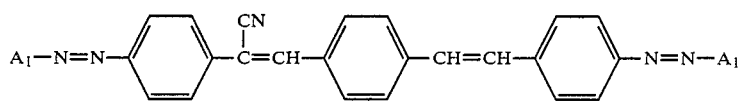

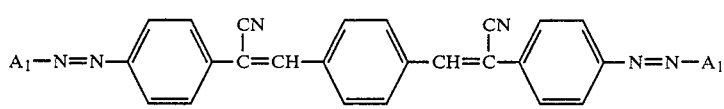

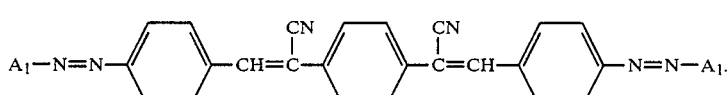

10. The photoreceptor of claim 3, 4 or 5 wherein said azo compound is selected from the group consisting of Formula III-1 to III-3

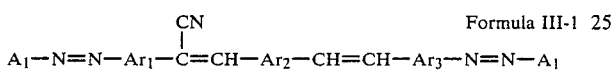 Formula III-1

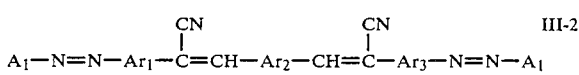 III-2

$A_1-N=N-Ar_1-CH=C(CN)-Ar_2-C(CN)=CH-Ar_3-N=N-A_1$    III-3 wherein $A_1$ is

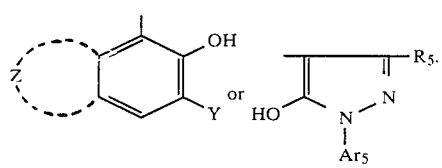

11. The photoreceptor of claim 10 wherein said azo compound is selected from the group consisting of Formula IV-1 to IV-3

$A_1-N=N-Ar_6-C(CN)=CH-Ar_7-CH=CH-Ar_8-N=N-A_1$    IV-1

$A_1-N=N-Ar_6-C(CN)=CH-Ar_7-CH=C(CN)-Ar_8-N=N-A_1$    IV-2

$A_1-N=N-Ar_6-CH=C(CN)-Ar_7-C(CN)=CH-Ar_8-N=N-A_1$    IV-3 wherein $Ar_6$, $Ar_7$ and $Ar_8$ are each a divalent phenyl group.

12. The photoreceptor of claim 11 wherein said azo compound is selected from the group consisting of Formula V-1 to V-3

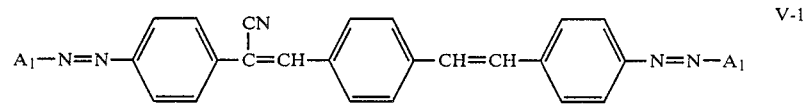

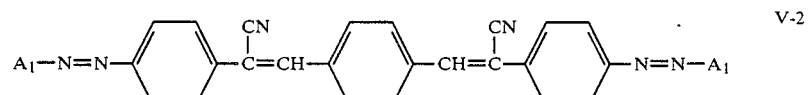

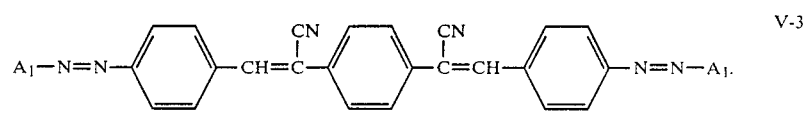

13. The photoreceptor of claim 6 wherein said azo compound is selected from the group consisting of III-1 to III-3

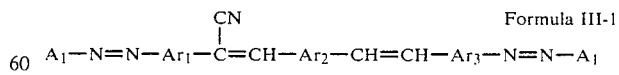 Formula III-1

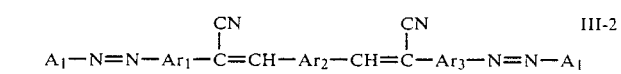 III-2

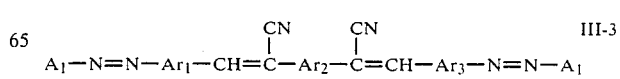 III-3 wherein $A_1$ is

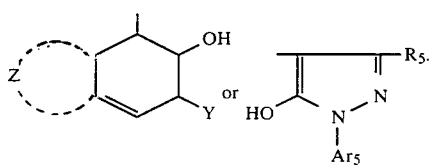
14. The photoreceptor of claim 13 wherein said azo compound is selected from the group consisting of Formula IV-1 to IV-3
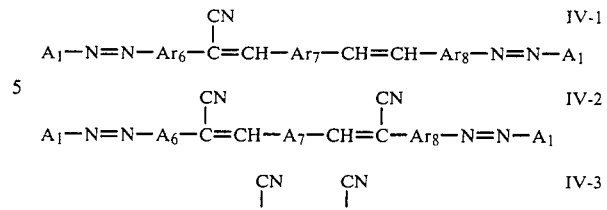
wherein $Ar_6$, $Ar_7$, and $A_8$ are each a divalent phenyl group.
15. The photoreceptor of claim 14 wherein said azo compound is selected from the group consisting of Formula V-1 to V-3
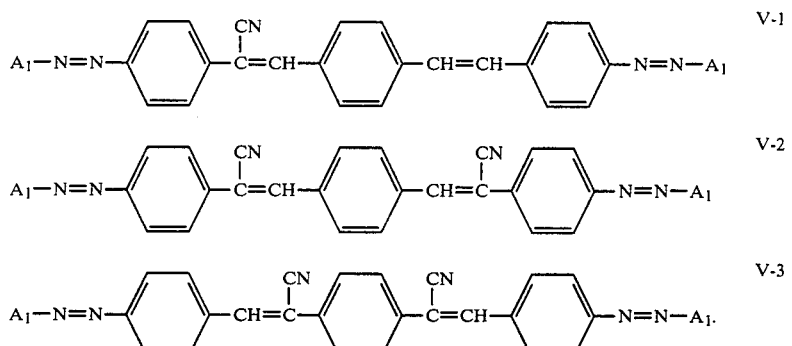
* * * * *

UNITED STATES PATENT AND TRADEMARK OFFICE
CERTIFICATE OF CORRECTION

PATENT NO. : 4,537,847                          Page 1 of 2

DATED       : August 27, 1985

INVENTOR(S) : Takahashi, et al

It is certified that error appears in the above-identified patent and that said Letters Patent is hereby corrected as shown below:

Columns 23 and 24 (second occurrence) should be deleted to appear as per attached Columns 27 and 28.

(This will apply to the Grant Only).

Signed and Sealed this

Second Day of September 1986

[SEAL]

*Attest:*

DONALD J. QUIGG

*Attesting Officer*         *Commissioner of Patents and Trademarks*

-continued
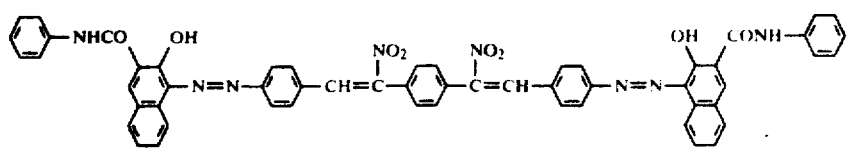 A-(85)
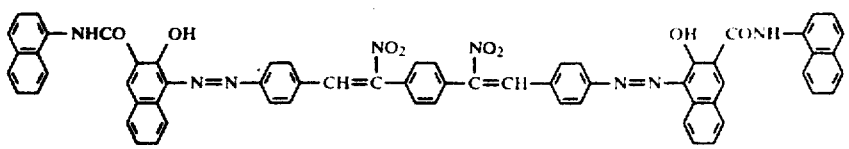 A-(86)
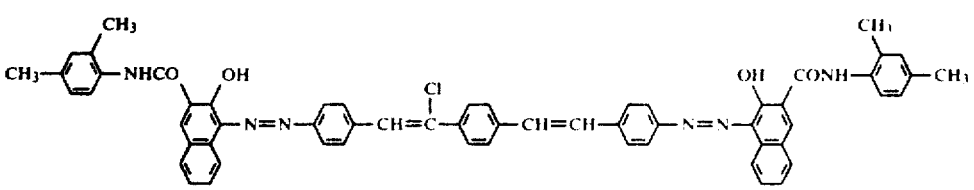 A-(87)
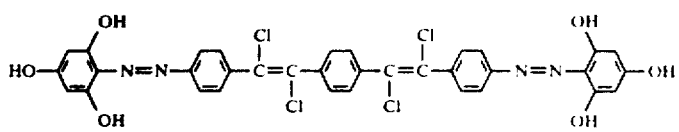 A-(88)
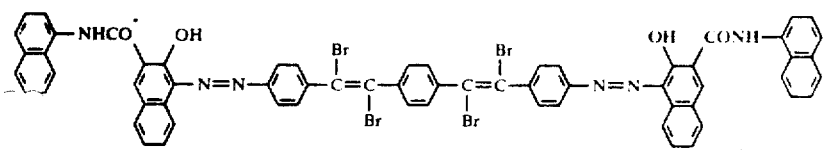 A-(89)
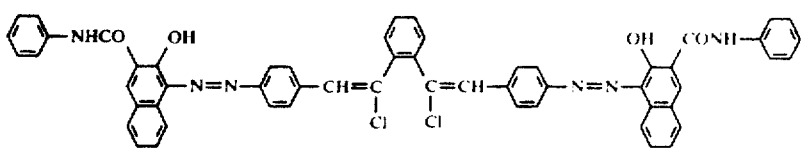 A-(90)
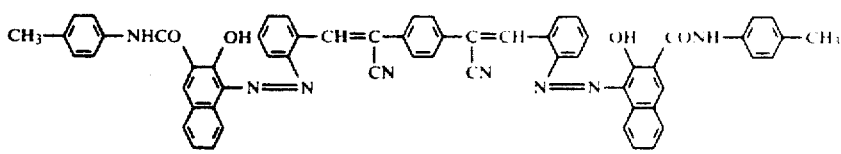 A-(91)
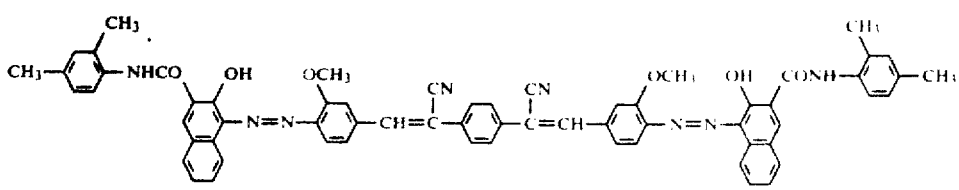 A-(92)
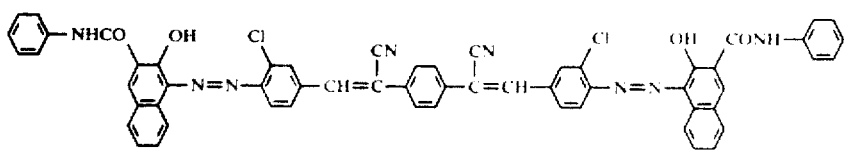 A-(93)